United States Patent [19]
Ishimoto et al.

[11] Patent Number: 5,933,520
[45] Date of Patent: *Aug. 3, 1999

[54] IMAGE PROCESSING APPARATUS

[75] Inventors: Koichi Ishimoto; Masahiro Funada; Yoichi Takaragi, all of Yokohama; Takeshi Aoyagi, Tokyo, all of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/411,217

[22] Filed: Mar. 27, 1995

[30] Foreign Application Priority Data

Mar. 25, 1994 [JP] Japan ................................. 6-056263

[51] Int. Cl.$^6$ .............................. G06K 9/00; G06K 9/68; G06K 9/20; G06K 9/36
[52] U.S. Cl. ......................... 382/135; 382/165; 382/218; 382/282; 399/366
[58] Field of Search ..................................... 382/135, 162, 382/165, 218, 282; 358/296, 500; 399/366

[56] References Cited

U.S. PATENT DOCUMENTS

| | | | |
|---|---|---|---|
| 4,310,180 | 1/1982 | Mowry, Jr. et al. | 283/8 |
| 4,459,020 | 7/1984 | May et al. | 355/132 |
| 4,579,370 | 4/1986 | Corwin et al. | 283/72 |
| 4,637,051 | 1/1987 | Clark | 382/1 |
| 4,728,984 | 3/1988 | Daniele | 355/6 |
| 4,739,377 | 4/1988 | Allen | 355/133 |
| 4,796,921 | 1/1989 | Neiman | 283/91 |
| 4,807,027 | 2/1989 | Muto | 358/108 |
| 5,021,876 | 6/1991 | Kurita et al. | 358/75 |
| 5,050,224 | 9/1991 | Mori | 382/34 |
| 5,055,834 | 10/1991 | Chiba | 340/825 |
| 5,193,121 | 3/1993 | Elischer et al. | 382/7 |
| 5,216,724 | 6/1993 | Suzuki et al. | 382/135 |
| 5,227,871 | 7/1993 | Funada et al. | 358/75 |
| 5,231,663 | 7/1993 | Earl et al. | 380/18 |
| 5,257,119 | 10/1993 | Funada et al. | 382/165 |
| 5,321,470 | 6/1994 | Hasuo et al. | 355/201 |
| 5,363,202 | 11/1994 | Udagawa et al. | 358/501 |
| 5,363,454 | 11/1994 | Udagawa et al. | 382/17 |
| 5,379,093 | 1/1995 | Hashimoto et al. | 382/135 |
| 5,418,602 | 5/1995 | Nishikawa | 399/366 |
| 5,424,807 | 6/1995 | Ohmura | 399/366 |
| 5,426,710 | 6/1995 | Suzuki et al. | 382/135 |
| 5,430,525 | 7/1995 | Ohta et al. | 355/201 |

FOREIGN PATENT DOCUMENTS

| | | |
|---|---|---|
| 0079153 | 5/1983 | European Pat. Off. . |
| 0342060 | 11/1989 | European Pat. Off. . |
| 0463844 | 1/1992 | European Pat. Off. . |
| 0506479 | 9/1992 | European Pat. Off. . |
| 2360270 | 6/1974 | Germany . |
| 3229616 | 2/1984 | Germany . |
| 55-36873 | 3/1980 | Japan . |
| 5536873 | 3/1980 | Japan . |
| 60-87380 | 5/1984 | Japan . |
| 60-87380 | 5/1985 | Japan . |
| 63-256980 | 10/1988 | Japan . |
| 4-016707 | 1/1992 | Japan . |
| 4016707 | 1/1992 | Japan ............................. G01B 15/00 |
| A1400806 | 7/1975 | United Kingdom . |
| A1400806 | 9/1975 | United Kingdom . |

*Primary Examiner*—Bipin H. Shalwala
*Attorney, Agent, or Firm*—Fitzpatrick, Cella, Harper & Scinto

[57] ABSTRACT

The color tone distributions of a plurality of types of specific originals are stored in advance in a ROM, and a first similarity between the color tone distributions corresponding to a predetermined discrimination criterion, and an input image signal is discriminated. A second similarity between the color tone distributions corresponding to a discrimination criterion which is changed based on the first similarity, and the input image signal is discriminated. Whether or not an original is similar to one of the plurality of types of specific originals is discriminated on the basis of the first and second similarities.

18 Claims, 21 Drawing Sheets

FIG. 5

FIGURES 0 TO 7 CORRESPOND TO DISCRIMINATION CIRCUITS 0 TO 7

|  | 0 | 1 | 2 | 3 | 4 | 5 | 6 | 7 |
|---|---|---|---|---|---|---|---|---|
| FIRST SCAN a | a0 | a1 | a2 | a3 | a4 | a5 | a6 | a7 |
| SECOND SCAN b | b0 | b1 | b2 | b3 | b4 | b5 | b6 | b7 |
| THIRD SCAN c | c0 | c1 | c2 | c3 | c4 | c5 | c6 | c7 |
| FOURTH SCAN d | d0 | d1 | d2 | d3 | d4 | d5 | d6 | d7 |

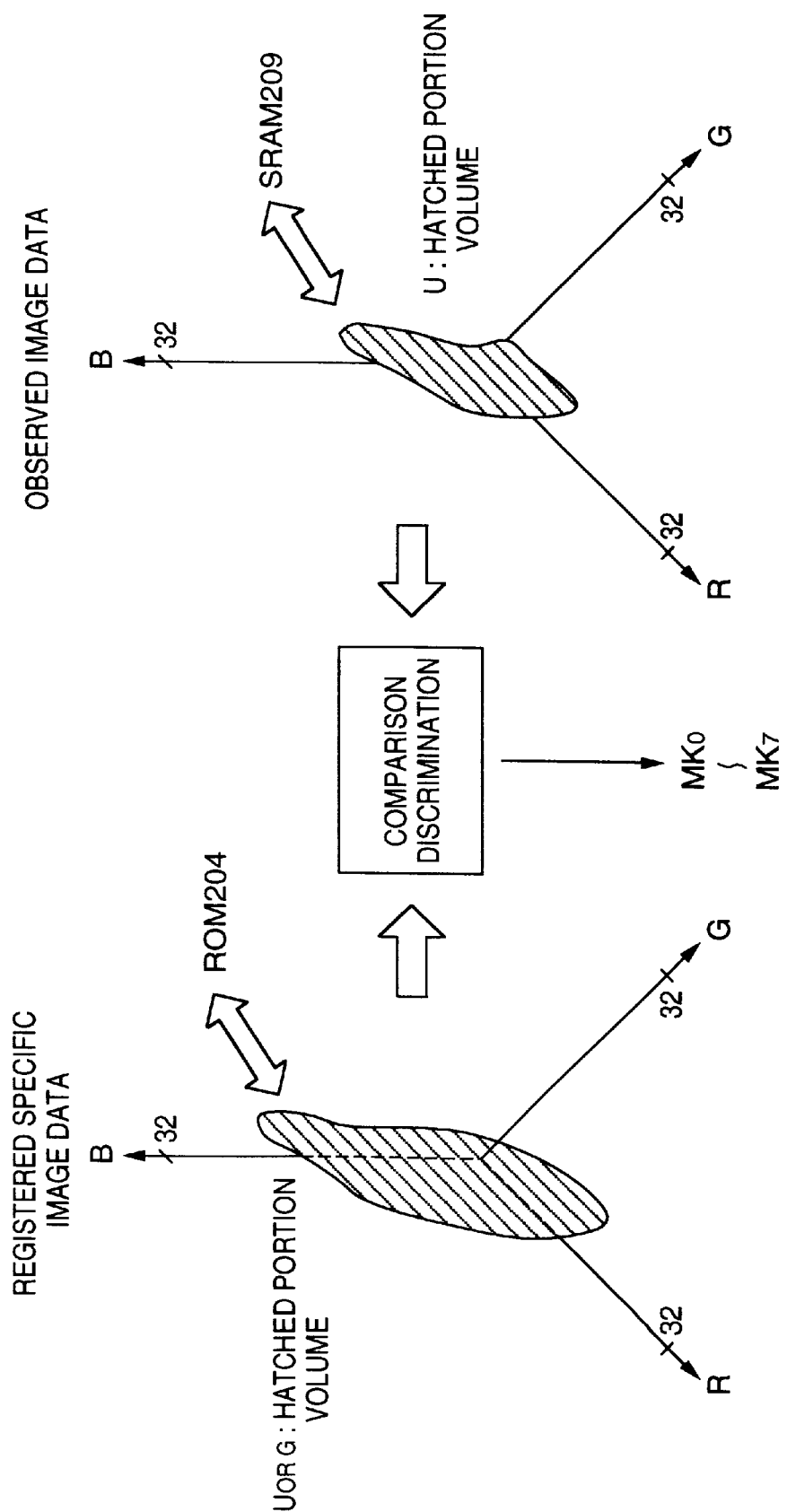

SPECIFIC ORIGINAL A
(OBVERSE SIDE OF BANKNOTE 1)

SPECIFIC ORIGINAL B
(REVERSE SIDE OF BANKNOTE 1)

SPECIFIC ORIGINAL C
(OBVERSE SIDE OF BANKNOTE 2)

SPECIFIC ORIGINAL D
(REVERSE SIDE OF BANKNOTE 2)

SPECIFIC ORIGINAL E
(OBVERSE SIDE OF BANKNOTE 3)

SPECIFIC ORIGINAL F
(REVERSE SIDE OF BANKNOTE 3)

FIG. 18

FIGURES 0 TO 7 CORRESPOND TO DISCRIMINATION CIRCUITS 0 TO 7

| | 0 | 1 | 2 | 3 | 4 | 5 | 6 | 7 |
|---|---|---|---|---|---|---|---|---|
| FIRST SCAN a | a0 YELLOW 0 | a1 YELLOW 1 | a2 YELLOW 2 | a3 YELLOW 3 | a4 GREEN 0 | a5 GREEN 1 | a6 GREEN 2 | a7 GREEN 3 |
| SECOND SCAN b | b0 BLUE 0 | b1 BLUE 1 | b2 BLUE 2 | b3 BLUE 3 | b4 YELLOW/RED 0 | b5 YELLOW/RED 1 | b6 YELLOW/RED 2 | b7 YELLOW/RED 3 |
| THIRD SCAN c | c0 GREEN/RED 0 | c1 GREEN/RED 1 | c2 GREEN/RED 2 | c3 GREEN/RED 3 | c4 BLUE/RED 0 | c5 BLUE/RED 1 | c6 BLUE/RED 2 | c7 BLUE/RED 3 |
| FOURTH SCAN d | d0 RED 0 | d1 RED 1 | d2 RED 2 | d3 RED 3 | d4 BROWN 0 | d5 BROWN 1 | d6 BROWN 2 | d7 BROWN 3 |

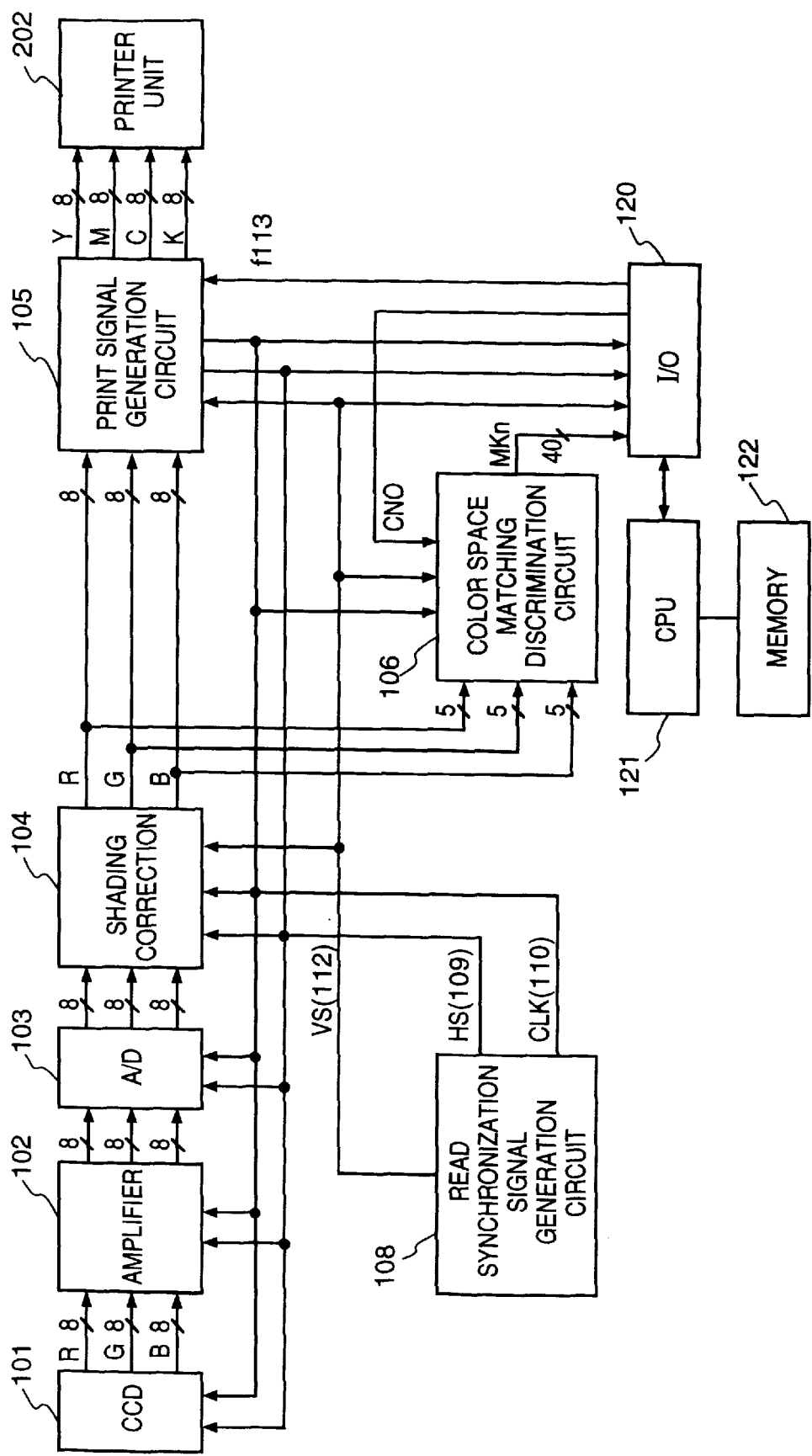

IMAGE PROCESSING APPARATUS

BACKGROUND OF THE INVENTION

The present invention relates to an image processing apparatus for detecting a specific original.

In recent years, along with the improvements in the performance of color copying machines and color printers, illegal uses of these apparatuses pose a problem. More specifically, these apparatuses are used for counterfeiting banknotes (paper money), securities, and the like. For this reason, techniques for preventing copies of specific originals are demanded.

As one of such techniques, the present applicant has proposed the following technique (U.S. Pat. No. 5,227,871). That is, the distribution information of color tones, on a color space, of each specific original is registered in advance, and whether or not input image data is one of the registered specific originals is discriminated by comparing the registered distribution information with the color tone distribution of the input image data.

However, the above-mentioned conventional specific original discrimination method suffers from the problem that the number of types of specific originals to be discriminated is very large, i.e., the number of color tone distribution information to be registered in advance in a color copying machine or a color printer is very large. If only banknotes are to be discriminated, the number of types of banknotes to be registered exceeds several tens in consideration of differences in designs on their two sides, and necessity of registration of banknotes issued in surrounding countries in, especially, Europe.

In order to improve the discrimination rate of a specific original, a single specific original is preferably discriminated using a plurality of types of tone color distribution information. Although the discrimination conditions become stricter, the number of color tone discrimination information to be used in discrimination is preferably as large as possible to eliminate discrimination errors.

SUMMARY OF THE INVENTION

The present invention has been made in consideration of the above-mentioned problems, and has as its object to provide an image processing apparatus for eliminating discrimination errors when detecting a specific original.

In order to achieve the above object, according to the present invention, there is provided an image processing apparatus for performing image processing of an image signal obtained by a plurality of optical scans of an original comprising means for prestoring color tone distributions of a plurality of types of specific originals, first discrimination means for discriminating a first similarity between the color tone distribution corresponding to a predetermined discrimination criterion, and the image signal, means for changing the discrimination criterion on the basis of the first similarity, second discrimination means for discriminating a second similarity between the color tone distribution corresponding to the changed discrimination criterion, and the image signal, and third discrimination means for discriminating on the basis of the first and second similarities whether or not the original is similar to one of the plurality of types of specific originals.

There is also provided an image processing apparatus comprising: reading means for scanning an original and generating image data; first judging means for judging whether the original has a first feature based on image data generated in a first scanning of the reading means; second judging means for judging whether the original has a second feature, which is different from the first feature, based on image data generated in a second scanning of the reading means; and discrimination means for discriminating whether the original is a predetermined original by performing a calculation using judging results of the first judging means and the second judging means.

It is another object of the present invention to provide an image processing apparatus which can efficiently discriminate a similarity for a common portion of a plurality of types of specific originals.

In order to achieve the above object, according to the present invention, there is provided an image processing apparatus comprising: input means for inputting image data representing an image; first judging means for judging whether the image has a first feature; second judging means for judging whether the image has a second feature; third judging means for judging whether the image has a third feature; first discrimination means for discriminating whether the image is a first predetermined image based on judging results of the first judging means and third judging means; and second discrimination means for discriminating whether the image is a second predetermined image, which is different from the first predetermined image, based on judging results of the second judging means and third judging means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 5 is a view for explaining the storage state of color tone discrimination information in the ROM 204;

FIG. 9 is a view for explaining the similarity between a specific original and an input image in the RGB color space;

FIG. 18 is a view showing the allocation of color tone distribution information stored in the ROM 204 according to the second embodiment;

FIG. 22 is a block diagram of a color space matching discrimination circuit in the third embodiment.

DETAILED DESCRIPTION OF THE PREFERRED EMBODIMENTS

The preferred embodiments of the present invention will be described in detail hereinafter with reference to the accompanying drawings. In the embodiments to be described below, the present invention is applied to a copying machine. However, the present invention is not limited to this, but may be applied to various other apparatuses.

First Embodiment

Figure 1:
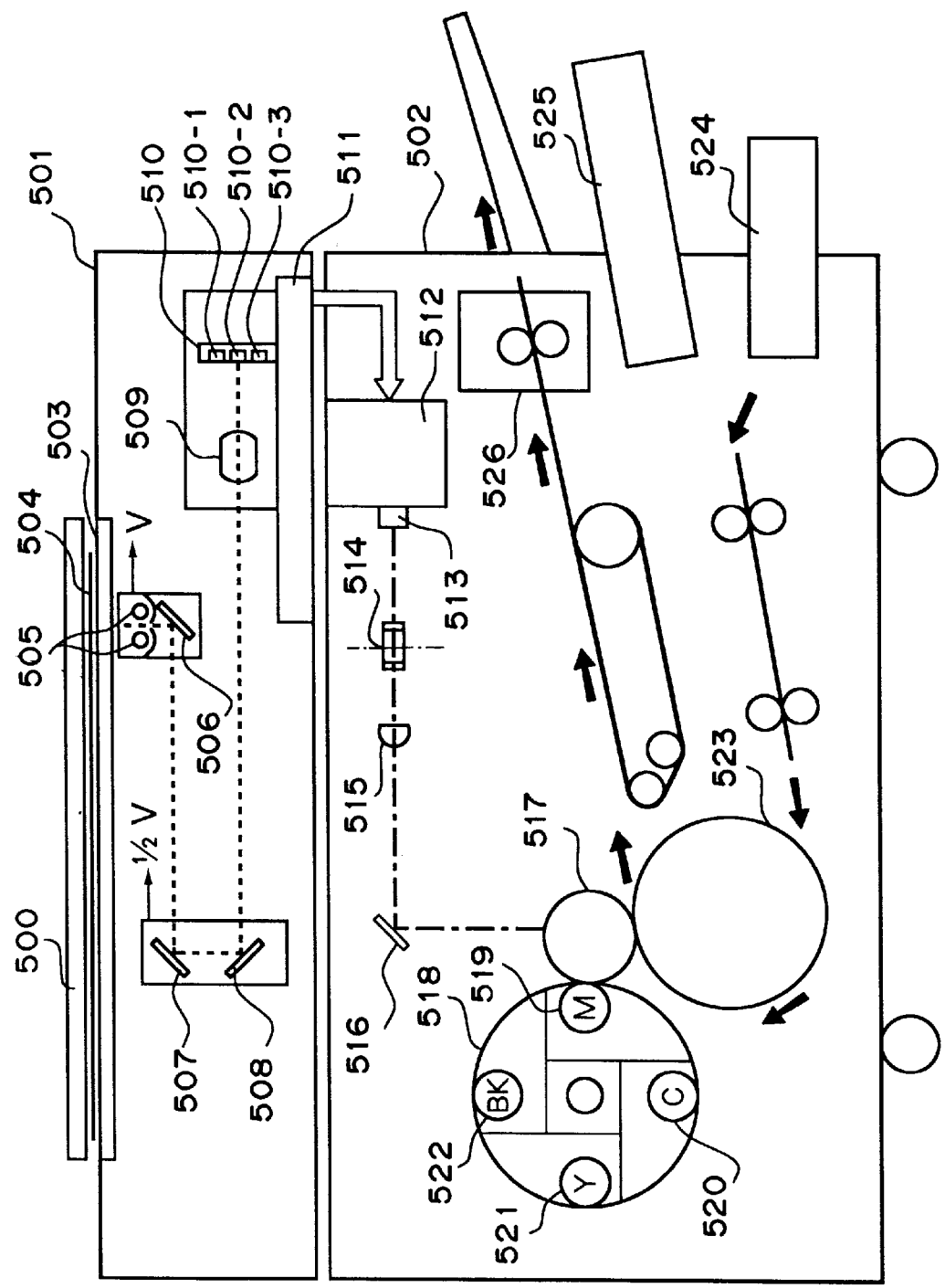
FIG. 1 is a schematic view showing a copying machine according to the first embodiment of the present invention.

FIG. 1 is a schematic view of a copying machine according to the first embodiment of the present invention. Referring to FIG. 1, reference numeral 501 denotes an image scanner unit which reads an original image at a resolution of 400 dpi (dots/inch), and performs digital signal processing of the read image signal. Reference numeral 502 denotes a printer unit for printing out a full-color image corresponding to an original image read by the image scanner 501 on a recording sheet at a resolution of 400 dpi.

In the image scanner unit 501, reference numeral 500 denotes a mirror surface pressing plate. An original 504 on an original table glass (to be referred to as a platen hereinafter) 503 is irradiated with light emitted by lamps 505, and light reflected by the original is guided to mirrors 506, 507, and 508. The reflected light forms an image on a 3-line sensor (to be referred to as a CCD hereinafter) 510 via a lens 509, and the formed image is supplied to a signal processing unit 511 as red (R), green (G), and blue (B) components of full-color information.

Note that the lamps 505 and the mirror 506 mechanically move at a velocity v in a direction perpendicular to the electrical scanning (main scanning) direction of the CCD, and the mirrors 507 and 508 mechanically move at a velocity (½)v in that direction, thereby scanning (sub-scanning) the entire surface of the original.

The signal processing unit 511 electrically processes image signals read by the image scanner unit 501 to convert the image signals into magenta (M), cyan (C), yellow (Y), and black (Bk) components, and supplies these signals to the printer unit 502. By a single original scanning operation of the image scanner unit 501, one of the M, C, Y, and Bk components is supplied to the printer unit 502, and a single print-out sequence is completed by a total of four original scanning operations. That is, the printer unit 502 frame-sequentially forms color component images in synchronism with a scanning operation of the image scanner unit 501.

Each of the image signals M, C, Y, and Bk from the image scanner unit 501 is supplied to a laser driver 512. The laser driver 512 drives a semiconductor laser 513 in accordance with the received image signal for obtaining a modulated laser beam. The modulated laser beam scans the surface of a photosensitive drum 517 via a polygonal mirror 514, an f-θ lens 515, and a mirror 516.

Reference numeral 518 denotes a rotary developing unit, which is constituted by a magenta developer 519, a cyan developer 520, a yellow developer 521, and a black developer 522. When these four developers are alternately brought into contact with the photosensitive drum 517, an electrostatic latent image formed on the photosensitive drum 517 is developed with a predetermined toner.

Reference numeral 523 denotes a transfer drum. A paper sheet supplied from a paper cassette 524 (or a paper cassette 525) is wound around the transfer drum, and the developed image on the photosensitive drum 517 is transferred onto the recording sheet.

After four color toner images M, C, Y, and Bk are sequentially transferred onto the recording sheet, the recording sheet passes a fixing unit 526, so that the toner images are fixed on the paper sheet. Thereafter, the recording sheet is exhausted outside the apparatus.

Figure 2:
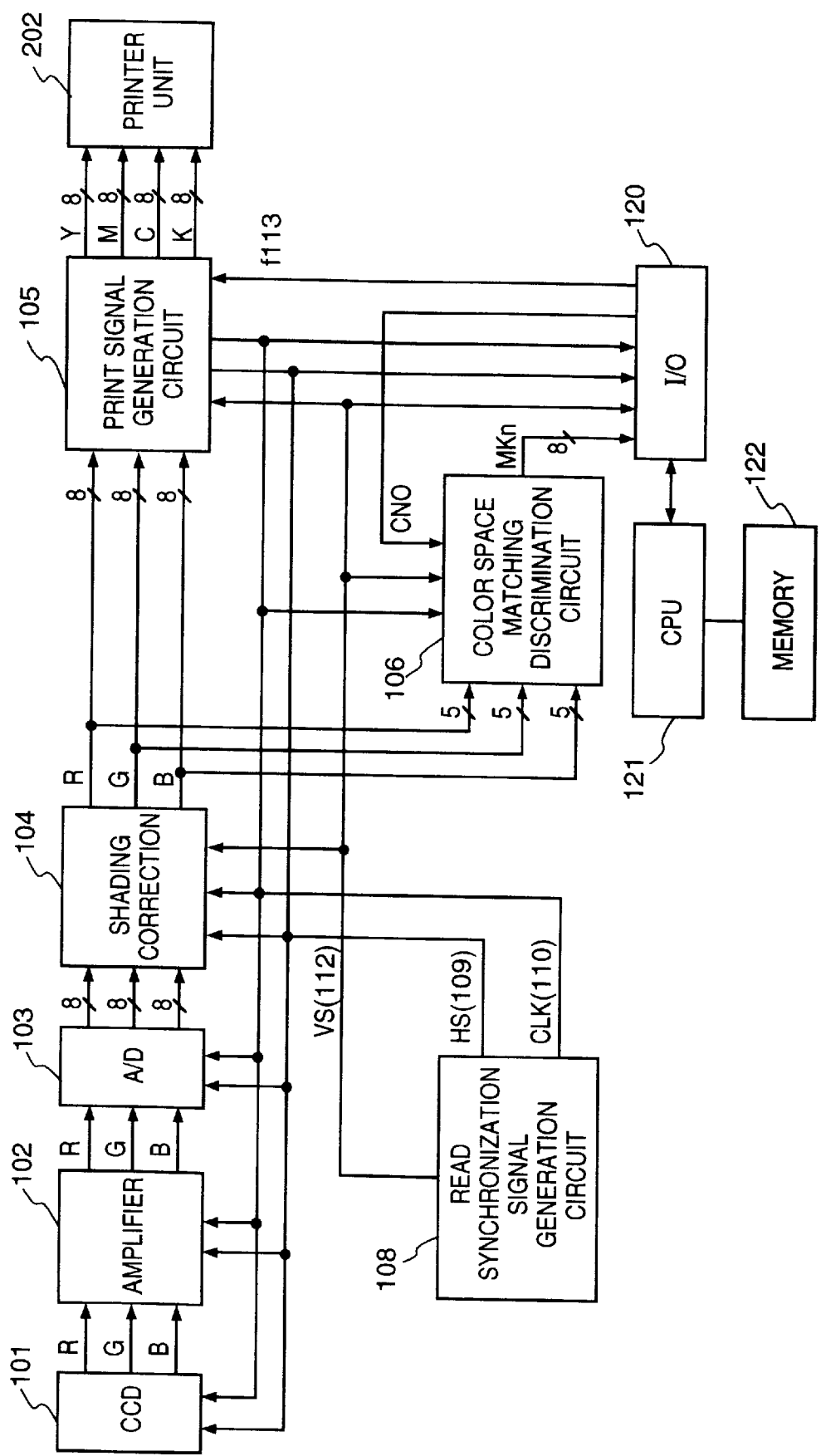
FIG. 2 is a block diagram showing a signal processing system in the copying machine of the first embodiment.

FIG. 2 is a block diagram showing a signal processing system in the copying machine according to this embodiment. Referring to FIG. 2, reference numeral 101 denotes a CCD sensor; 102 denotes an analog amplifier; and 103 denotes an A/D converter. Reference numeral 104 denotes a shading correction circuit for correcting variations in brightness levels depending on the reading positions of image signals. Note that the shading correction is a known technique, and a detailed description thereof will be omitted.

Reference numeral 105 denotes a print signal generation circuit, which converts R (red), G (green), B (blue) input image signals into M (magenta), C (cyan), Y (yellow), and K (black) print signals. The print signal generation circuit includes delay means for correcting the time required for discriminating a specific original (to be described later). Also, the print signal generation circuit 105 modulates the print signals in accordance with a discrimination correction signal f 113.

Reference numeral 106 denotes a color space matching discrimination circuit which calculates, in real time, the similarity between the color tone distributions of input image data and a specific original such as banknotes, securities, and the like. Reference numeral 108 denotes a read synchronization signal generation circuit which generates read synchronization signals HS 109, CLK 110, and VS 112. Of these signals, the signal HS 109 is a main scanning period signal, the signal CLK 110 is a pixel read fundamental clock signal, and the signal VS 112 is a period signal indicating the effective region, in the sub-scanning direction, of original reading.

Furthermore, reference numeral 121 denotes a microprocessor (to be referred to as a CPU hereinafter), which controls the entire copying machine of this embodiment; 120 denotes an input/output port (to be referred to as an I/O port hereinafter); and 122 denotes a memory for storing control programs of the CPU 121, and data required for various calculations.

A frame-sequential signal CNO input to the color space matching discrimination circuit 106 in FIG. 2 is a 2-bit output color selection signal, which controls the order of the above-mentioned four reading operations as follows. Note that the signal CNO is generated by the CPU 121 via the I/O port 120, and switches the operation condition of a masking/UCR arithmetic circuit A 601 (to be described later).

| CNO Signal | Print Output |
|---|---|
| 0 | Magenta (M) |
| 1 | Cyan (C) |
| 2 | Yellow (Y) |
| 3 | Black (Bk) |

Figure 3:
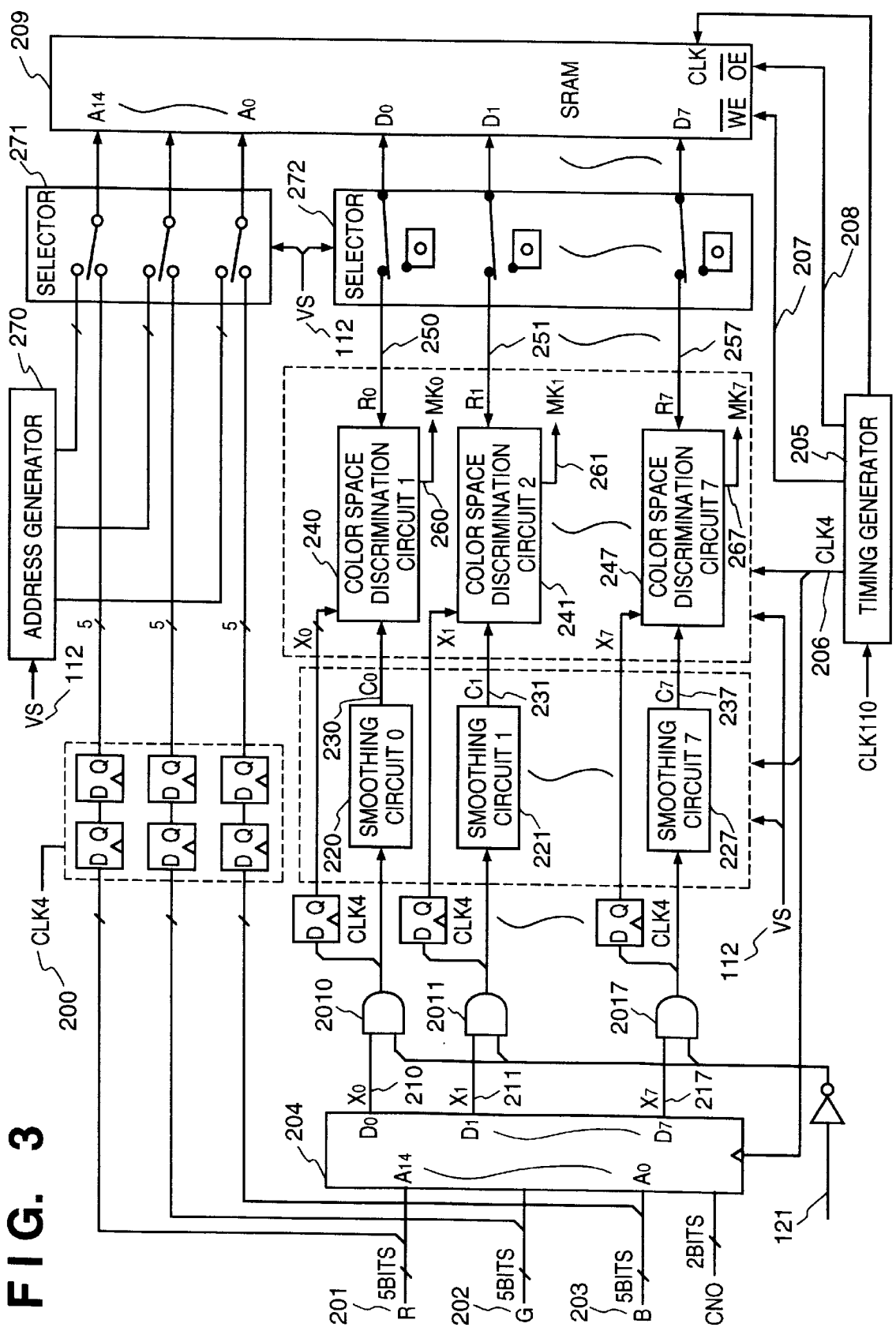
FIG. 3 is a block diagram showing the internal arrangement of a color space matching discrimination circuit 106.

FIG. 3 is a block diagram showing the internal arrangement of the color space matching discrimination circuit 106. Referring to FIG. 3, a signal R 201 corresponds to the upper 5 bits of an 8-bit R signal from the shading correction circuit 104 shown in FIG. 2. Similarly, a signal G 202 corresponds to a 5-bit G signal, and a signal B 203 corresponds to a 5-bit B signal.

Figure 4:
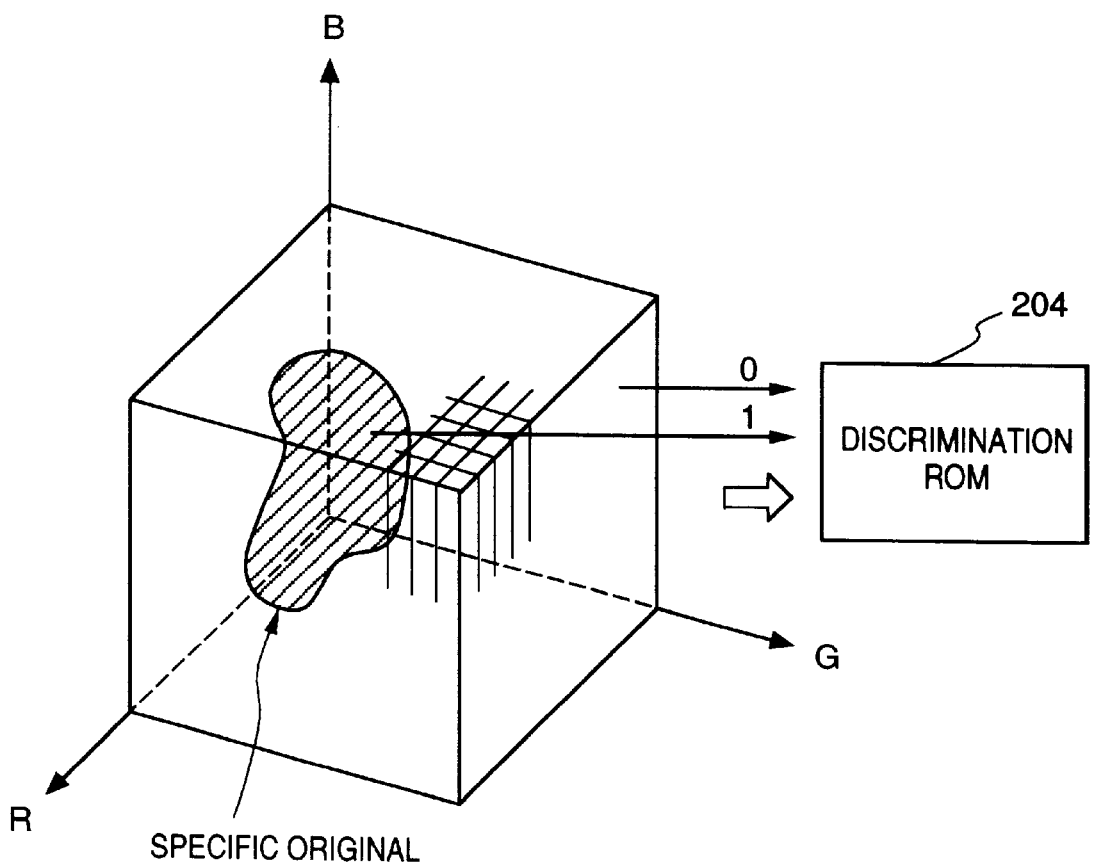
FIG. 4 is a view for explaining the storage method of color tone discrimination information in a ROM 204.

Reference numeral 204 denotes a discrimination ROM (to be referred to as a ROM hereinafter), which stores information associated with the color tones of a plurality of types of specific originals, as shown in FIG. 4. More specifically, the color tone distributions of specific originals are examined in advance, and the ROM 204 stores a discrimination result indicating whether or not the color tone of a pixel of interest matches that of any such specific original. The ROM 204 receives the frame-sequential signal CNO at the upper 2 bits of its address, and the upper 5 bits of thinned-out R, G, and B image signals at the lower 15 bits of its address.

Address buses A0 to A14 receive the R, G, and B signals. When the input signals match the color tones of any of the plurality of types of specific originals, discrimination signals "1" are output onto corresponding data buses D0 to D7; otherwise, discrimination signals "0" are output onto the data buses D0 to D7. The data buses D0 to D7 correspond to 0th to seventh, eight different specific originals. The data buses D0 to D7 output inparalled, eight different types of color tone discrimination information associated with the specific originals in response to pixel data which are input in correspondence with the values 0 to 3 of the frame-sequential signals CNO.

In the copying machine according to this embodiment, eight different specific originals are discriminated in two scans. The discrimination method will be described below.

In the first scan, the eight different specific originals are discriminated, and in the second scan, these eight different specific originals are discriminated again using different color tone distribution information. The discrimination results of these specific originals in the first and second scans are logically ANDed to obtain a final discrimination result.

For this reason, a single discrimination circuit always discriminates an identical specific original in a plurality of scans. More specifically, data are set in advance in the ROM 204, so that color space discrimination circuits 0 to 7 (240 to 247) in FIG. 3 discriminate identical specific originals in the first and second scans. The same applies to data for other seven different specific originals.

Figure 6:
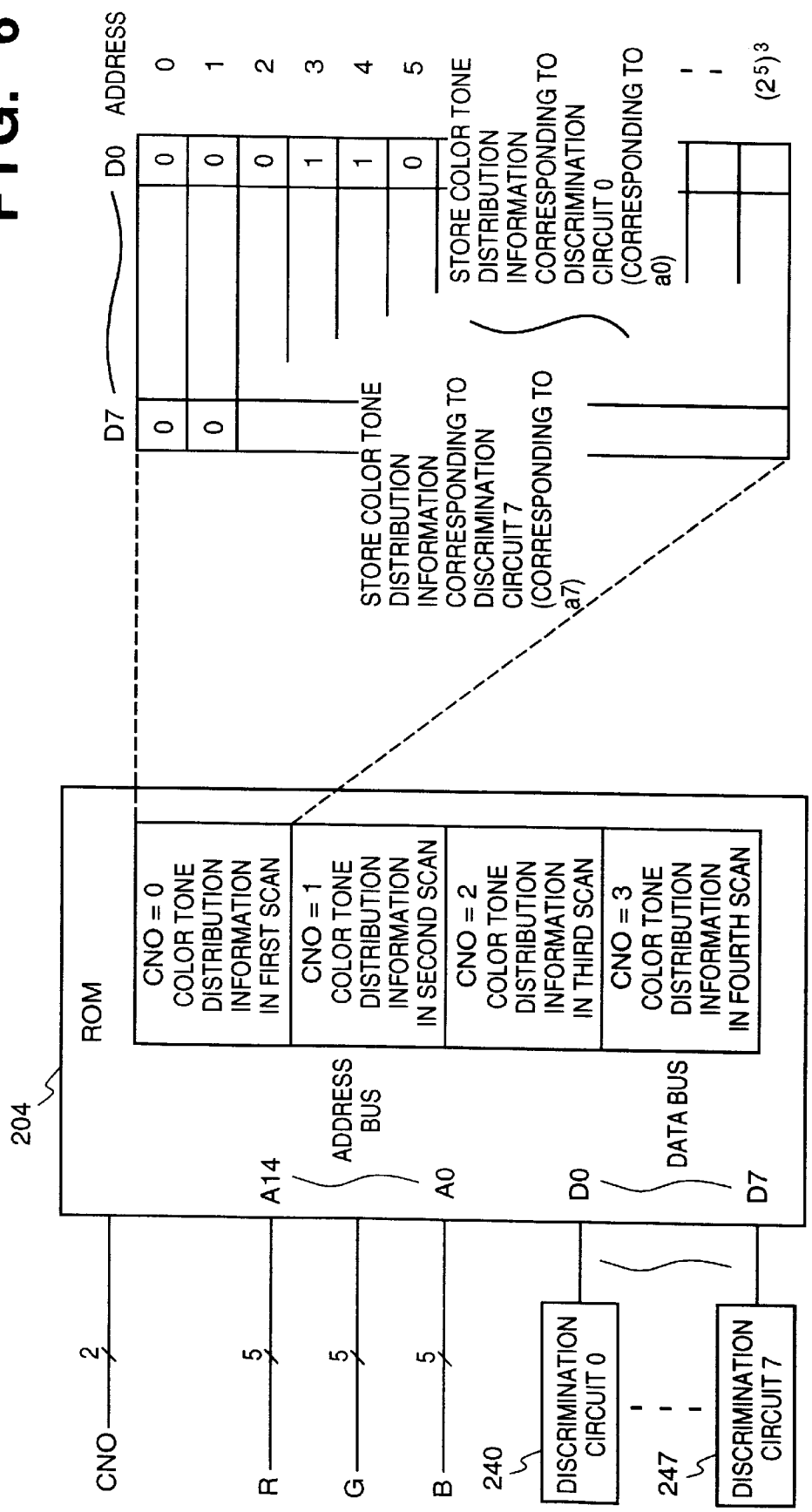
FIG. 6 is a view for explaining the storage state of color tone discrimination information in the ROM 204.

FIGS. 5 and 6 are views for explaining the storage state of color tone discrimination information in the ROM 204. Each of FIGS. 0 to 7 in FIG. 5 corresponds to each of eight kinds of originals. For example, as shown in FIG. 5, color tone distribution information used in the color space discrimination circuit 5 in the first scan is assumed to be "a5", and similarly, color tone distribution information used in the color space discrimination circuit 5 in the second scan is assumed to be "b5". In this embodiment, "a5" and "b5" are different types of color tone distribution information for discriminating a single specific original, and the same processing is performed for data corresponding to the other seven different specific originals.

As will be described later, for example, "a5" and "b5" also indicate the memory addresses at which the discrimination results obtained using these color tone distribution information are stored. Therefore, FIG. 5 directly corresponds to the address map of the memory 122 (to be described later).

Note that c0 to c7 and d0 to d7 are dummy data which are not looked up in this embodiment.

Figure 7:
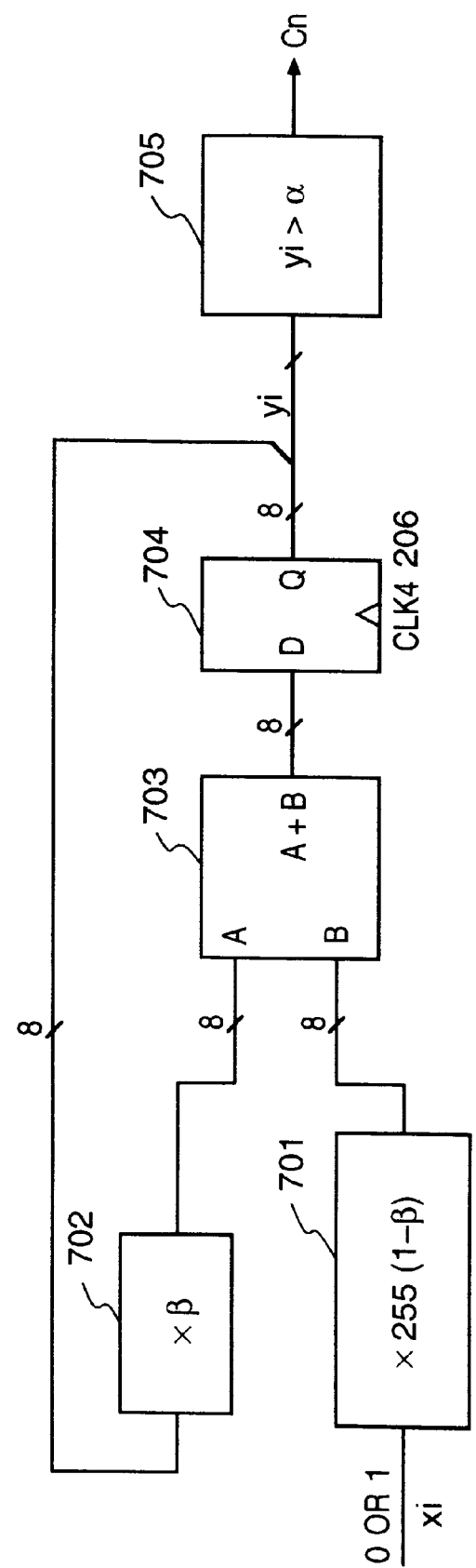
FIG. 7 is a block diagram showing the internal arrangement of smoothing circuits 0 to 7.
Figure 8B:
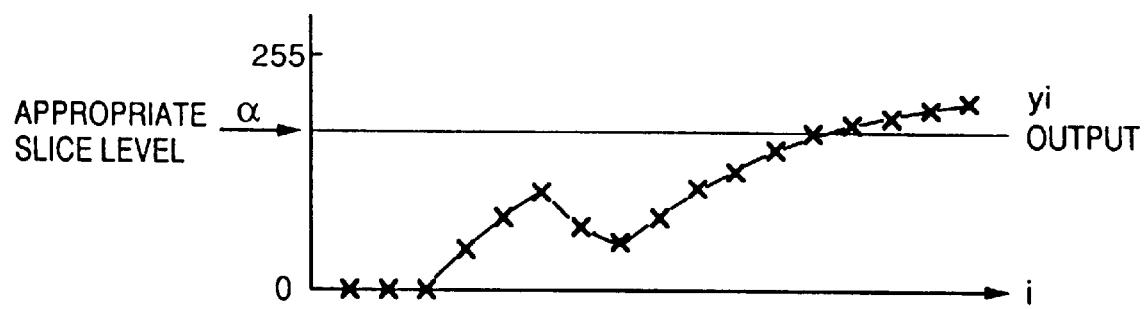
FIG. 8 is a graph showing the relationship between the input Xi and the smoothed value Yi.
Figure 8A:
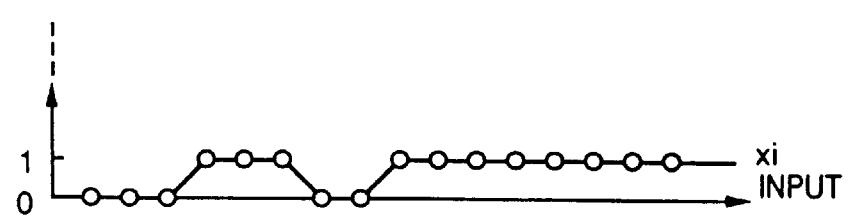

Reference numerals 220 to 227 in FIG. 3 denote smoothing circuits 0 to 7, which perform smoothing arithmetic operations shown in FIGS. 7 and 8 for color tone discrimination signals X0 to X7 output from the ROM 204.

FIG. 7 is a block diagram showing the internal arrangement of each of the smoothing circuits 0 to 7 (220 to 227). Referring to FIG. 7, reference numerals 701 and 702 denote multipliers; 703 denotes an adder; 704 denotes a latch circuit; and 705 denotes a comparator. The multipliers 701 and 702, and the adder 703 perform discrimination in consideration of continuity shown in FIG. 8 by calculating a weighted average of input data and previous data.

FIG. 8 shows the relationship between the input Xi to the smoothing circuit and the smoothed value Yi. As shown in FIG. 8, if the value of the input Xi is continuously "1", the value of the output Yi increases. Thus, when the input signal continuously matches the color tone of a specific original, output signals C0 to C7 (230 to 237) from the smoothing circuits 0 to 7 (220 to 227) become "1", and discrimination can be accurately performed without being influenced by noise and the like.

FIG. 9 is a view for explaining the similarly between a specific original and an input image in the RGB color space. The color space discrimination circuits 0 to 7 (240 to 247) shown in FIG. 3 calculate the similarities between specific original data and input image signal data in the RBG color space in real time, as shown in FIG. 9, and output color space similarity discrimination signals MK0 to MK7.

Figure 10:
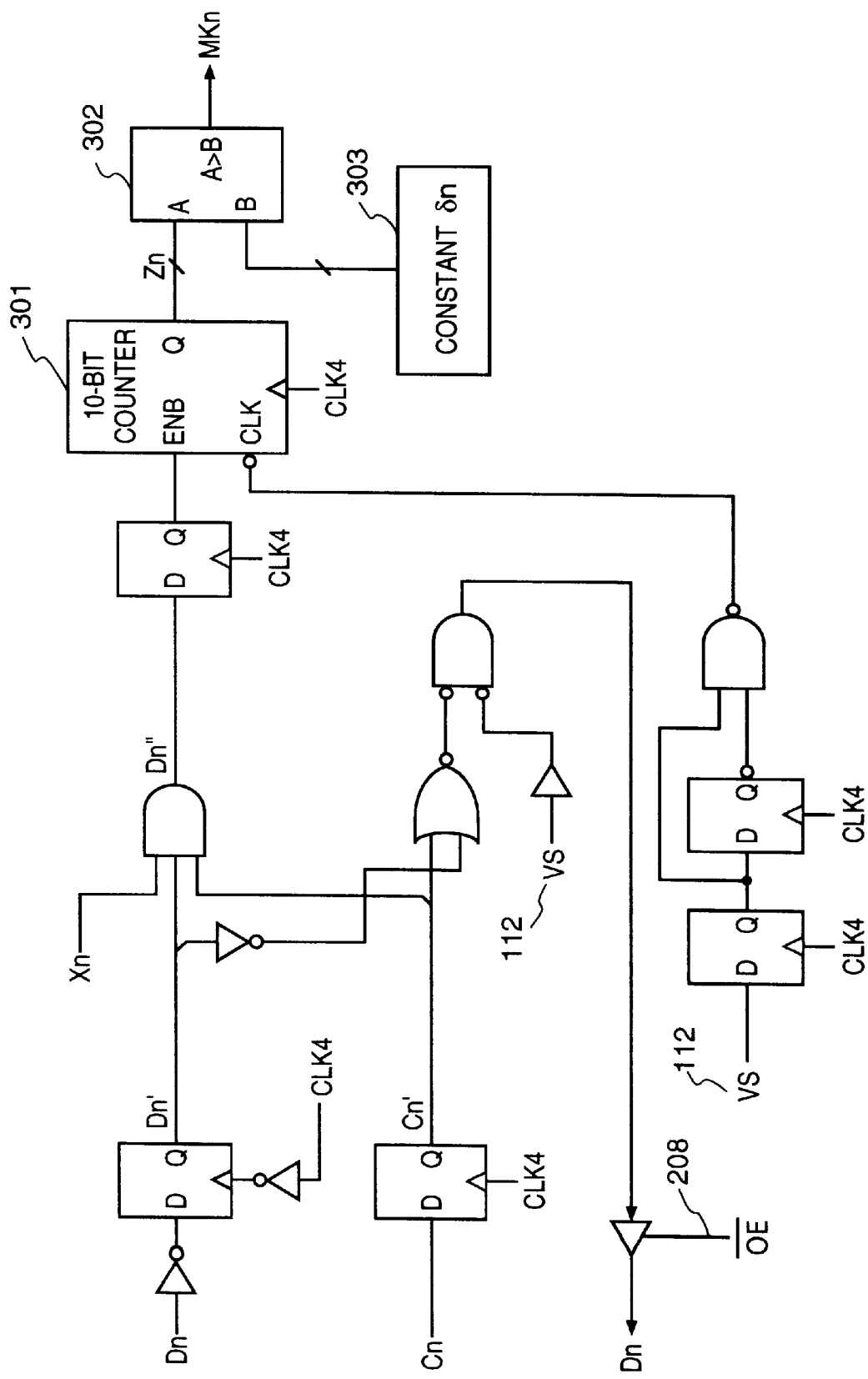
FIG. 10 is a block diagram showing the internal arrangement of the color space discrimination circuits 0 to 7 in FIG. 3.

FIG. 10 is a block diagram showing the internal arrangement of each of the color space discrimination circuits 0 to 7 (240 to 247) in FIG. 3. The discrimination circuit shown in FIG. 10 logically ORs data Dn from an SRAM 209 and a signal Cn from a corresponding one of the smoothing circuits 220 to 227 (n=0 to 7), and the result of this operation is stored in the SRAM 209.

Only when the data Dn changes from "0" to "1", is the value of a 10-bit counter 301 incremented. This counter 301 is cleared in response to the leading edge of the sub-scanning period signal VS 112, and an output value Zn from the counter 301 and a constant δn from a register 303 are compared by a comparator 302. As a result, if Zn>δn, MKn=1; if Zn≦δn, MKn=0.

Note that the value δn is set to be an L% value (in this embodiment, L=70) of Uorg indicated by a hatched portion in FIG. 9. More specifically, the value δn is given by:

$$\delta n = Uorg \times L/100 \tag{1}$$

where Uorg is a value defined by, as a unit volume, a cube having one side corresponding to a length obtained by dividing each of R, G, and B coordinate axes into 32 sections.

In this manner, each of the color space discrimination circuits 0 to 7 sets the color space similarly discrimination signal MKn to be "1" when the color tone distribution of an input image signal has substantially the same pattern as the color tone distribution of a specific original in the RGB color space.

The CPU 121 sets the discrimination correction signal f 113 to be "1"(logic High) or "0"(logic Low) in correspondence with the color space similarity discrimination signal MKn. Note that this operation will be described later.

Selectors 271 and 272 shown in FIG. 3 clear the contents of the SRAM 209 to zero when the sub-scanning period signal VS 112 is "0". An address generator 270 sequentially generates all addresses of the SRAM 209. More specifically, when the signal VS 112 is "0", the SRAM 209 is cleared to "0" in accordance with an address signal generated by the address generator 270.

Figure 11:
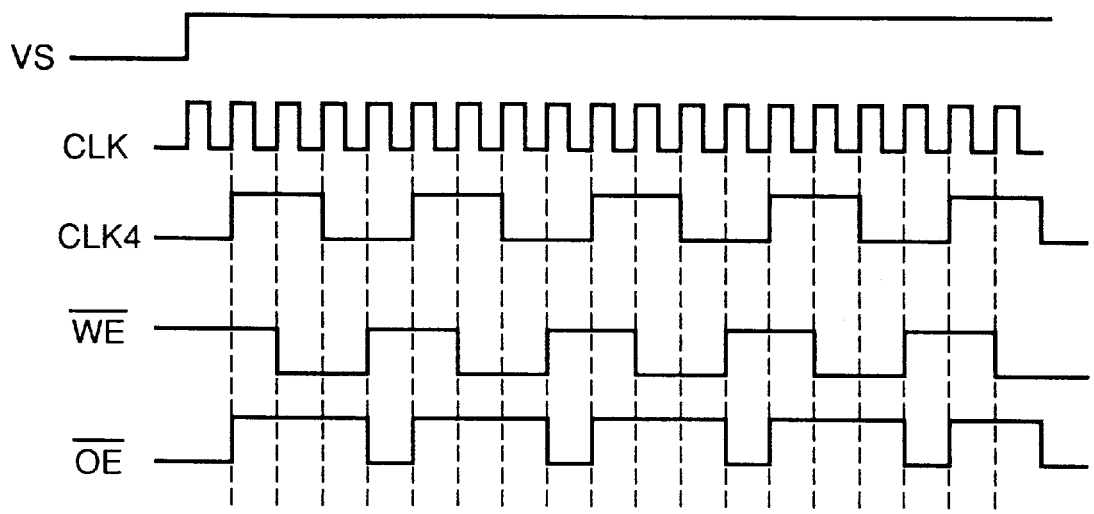
FIG. 11 is a timing chart of timing signals generated by a timing generator 205.
Figure 12:
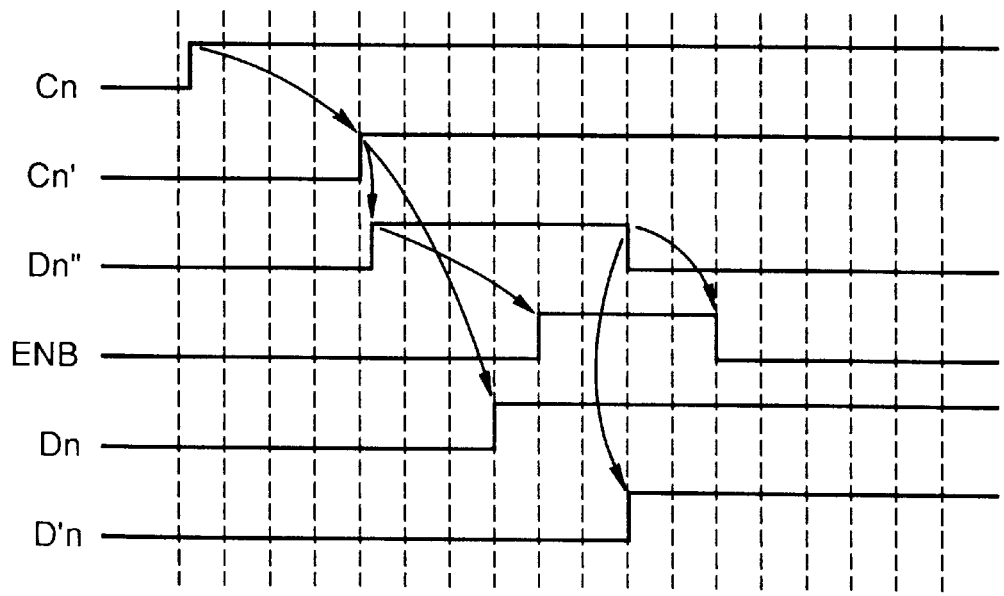
FIG. 12 is a timing chart of timing signals generated by the timing generator 205.

A timing generator 205 generates timing signals shown in the timing charts in FIGS. 11 and 12. Referring to FIGS. 11 and 12, a signal CLK4 (206) is a clock signal obtained by dividing a frequency of the fundamental clock signal CLK 110 into four, and a signal 207 is a signal for controlling the write enable (WE) terminal of the SRAM 209. On the other hand, a signal 208 is a signal for controlling the output enable (OE) terminal of the SRAM 209.

Figure 13:
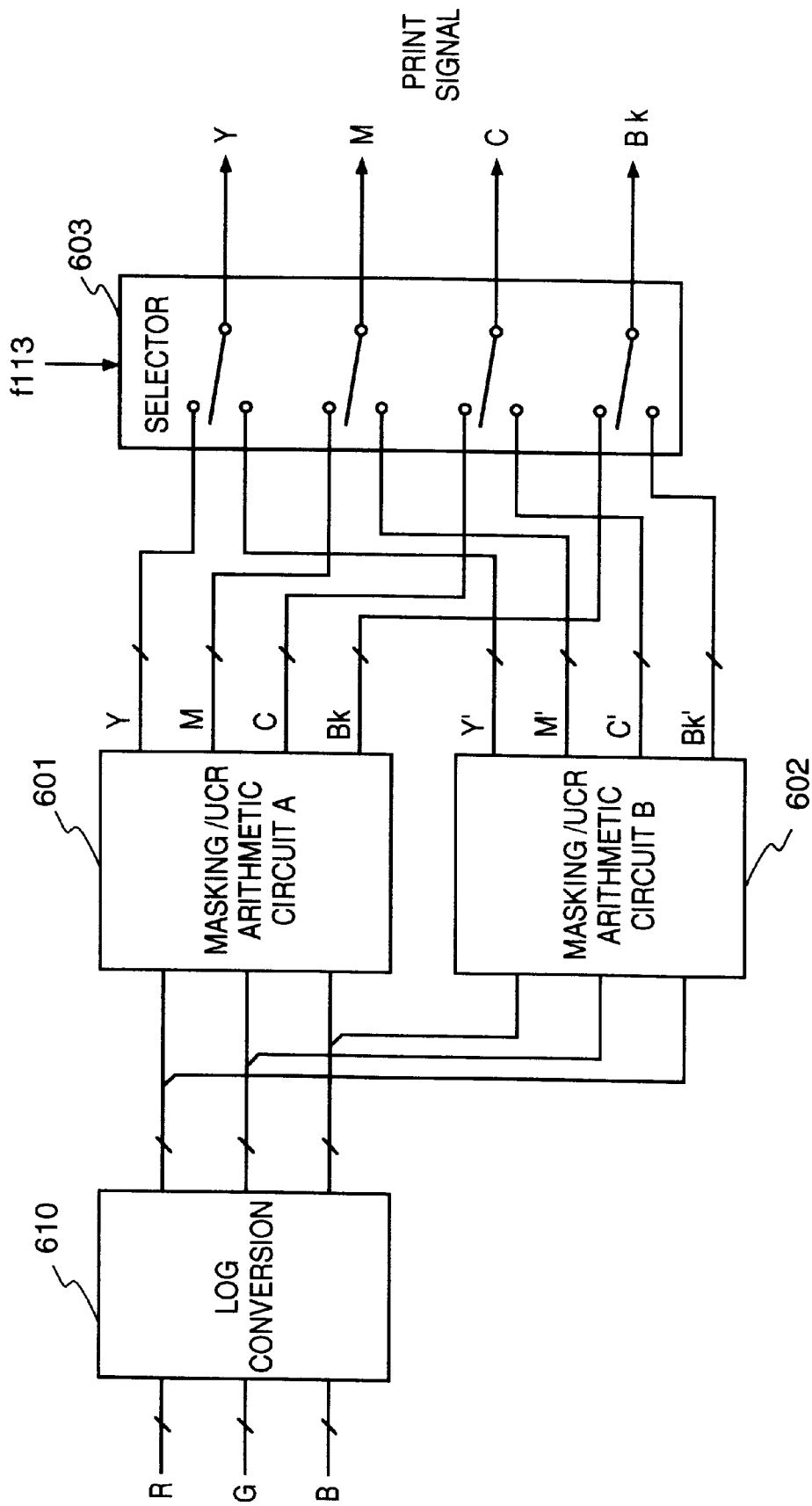
FIG. 13 is a block diagram showing the internal arrangement of a print signal generation circuit 105 shown in FIG. 2.

FIG. 13 is a block diagram showing the internal arrangement of the print signal generation circuit 105 in FIG. 2. Referring to FIG. 13, a masking/UCR arithmetic circuit A 601 generates Y, M, C, and K print signals on the basis of input R, G, and B signals in a normal state. The masking/UCR arithmetic circuit A changes signal generation conditions in correspondence with the value of the frame-sequential signal CNO. A masking/UCR arithmetic circuit B 602 generates Y, M, C, and K print signals whose color tone is changed (e. g., red is emphasized or the tone is blackened) when it is discriminated that the input image signal matches a specific original.

A selector 603 selects the output signals from the masking/UCR arithmetic circuits 601 and 602 in correspondence with the discrimination correction signal f 113 from the CPU 121, and outputs the selected signals, thus printing out an image in a different color tone.

The sequence for setting the discrimination correction signal f 113 to be "1" or "0" by the CPU 121 in the copying machine of this embodiment will be described in detail below.

Figure 14:
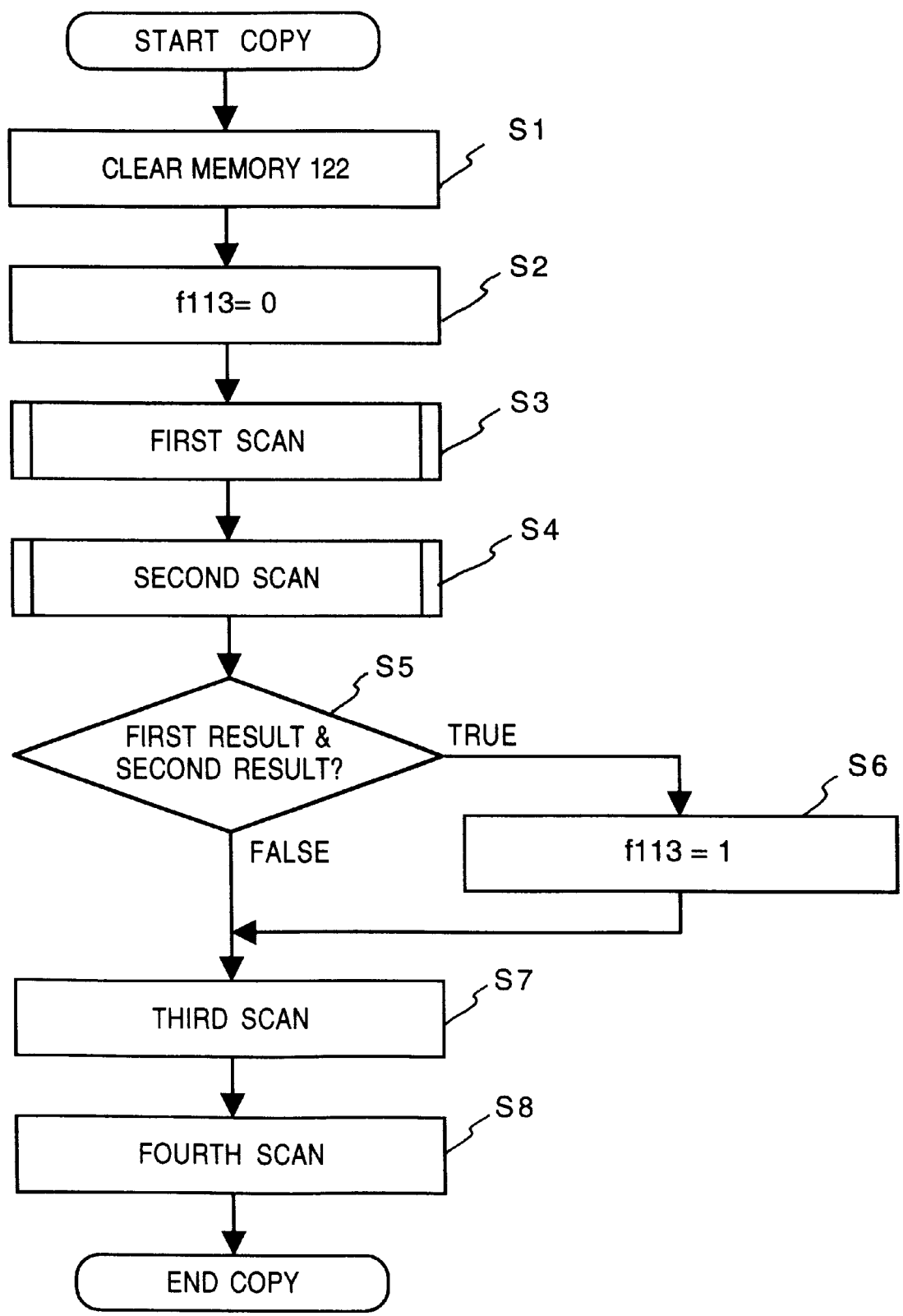
FIG. 14 is a flow chart showing a sequence for setting a discrimination correction signal f 113 to be "1" or "0" by a CPU 121.
Figure 15:
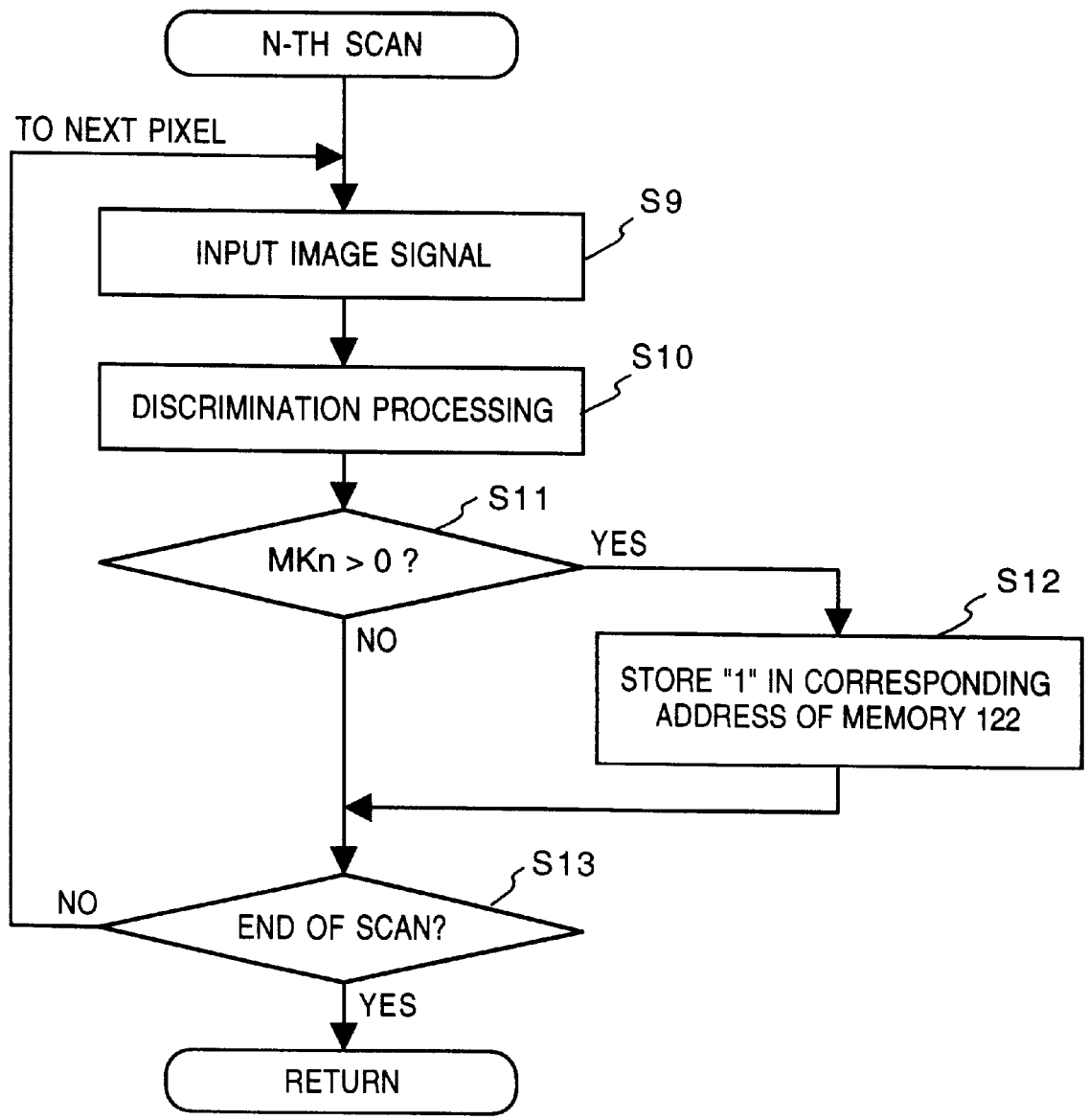
FIG. 15 is a flow chart showing the sequence for setting the discrimination correction signal f 113 to be "1" or "0" by the CPU 121.

FIGS. 14 and 15 are flow charts showing the sequence for setting the discrimination correction signal f 113 to be "1" or "0" by the CPU 121.

Referring to FIG. 14, when a copying operation is instructed to start by an operation unit in the copying machine of this embodiment, the CPU 121 clears the contents of the memory 122 to zero (step S1). The CPU 121 sets the discrimination correction signal f 113 to be "0"(Low) (step S2), and thereafter, performs the above-mentioned first scan (step S3).

FIG. 15 is a flow chart showing this scan processing sequence. More specifically, when the scan is started, an image signal is input to the color space matching discrimination circuit 106 (see FIG. 2) (step S9). The discrimination processing of the input signal is performed (step S10).

Figure 16:
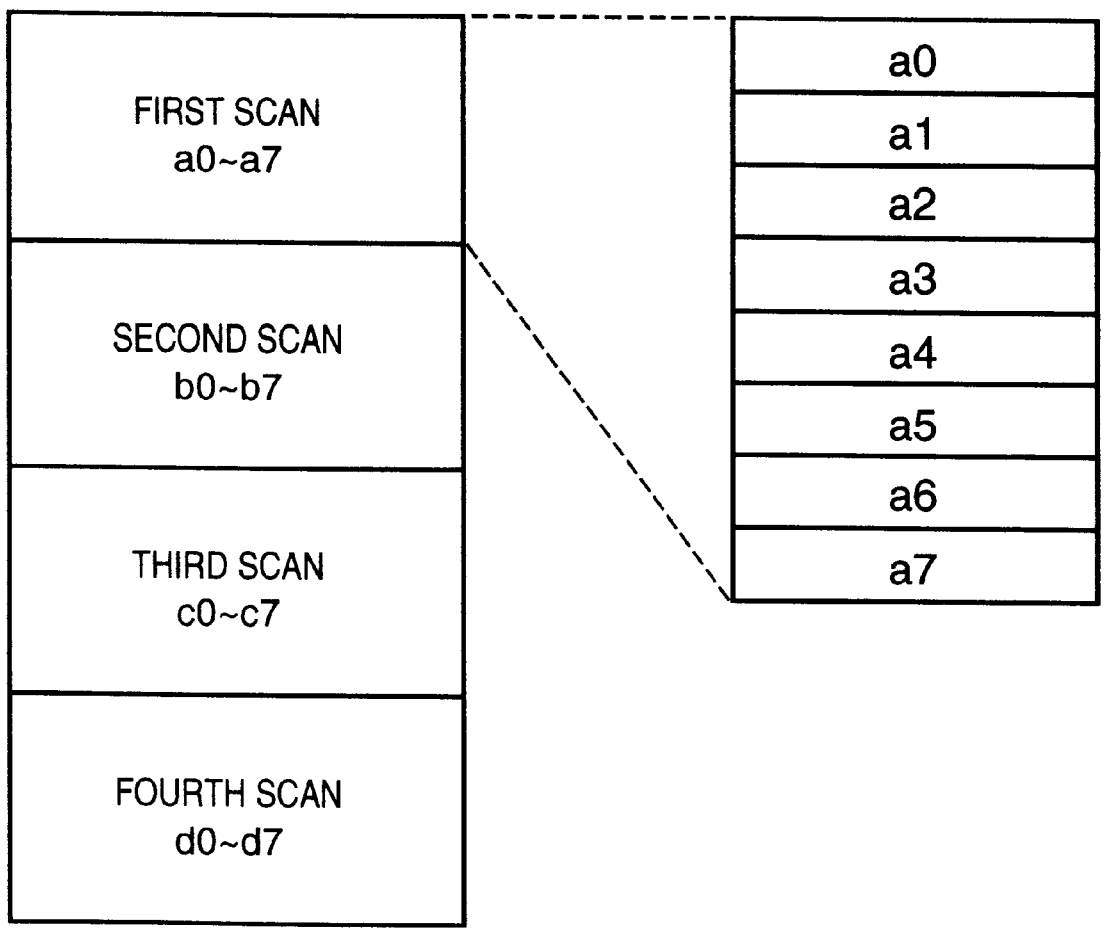
FIG. 16 shows the address map of a memory 122.
Figure 17A:
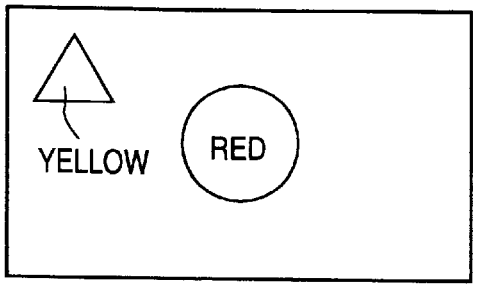
FIGS. 17A to 17F are views showing the obverse and reverse sides of three different banknotes as specific originals to be discriminated according to the second embodiment of the present invention.
Figure 17B:
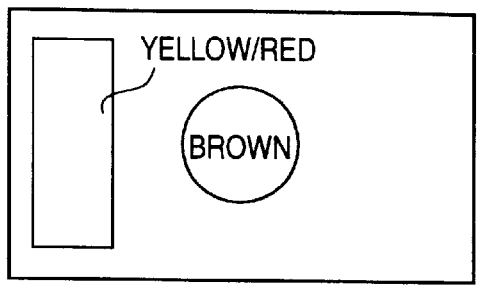
Figure 17C:
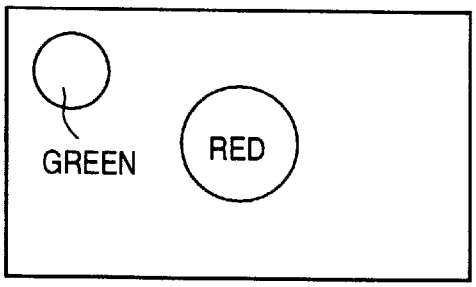
Figure 17D:
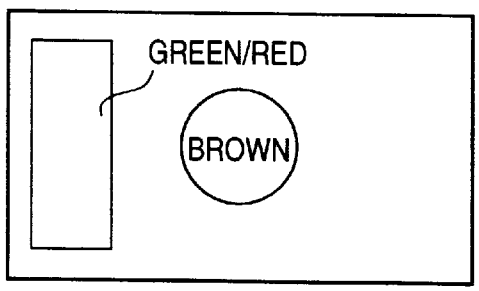
Figure 17E:
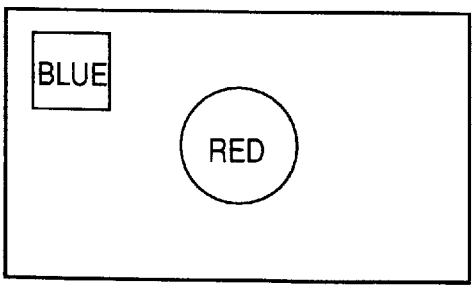
Figure 17F:
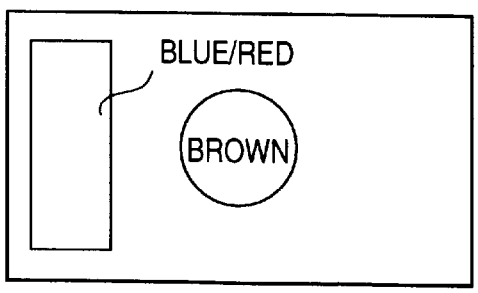

If one of the above-mentioned color space similarity discrimination signals MKn (n=0 to 7) is "1"(YES in step S11), "1" is stored in the corresponding address area of the memory 122. FIG. 16 shows the addresses of the memory 122. For example, if the discrimination signal MK5="1" in the first scan, "1" is stored in the area of address a5. On the other hand, if all the color space similarity discrimination signals MKn are "0"(NO in step S11), no processing is performed.

In step S13, it is checked if the scan is completed. If it is determined that the scan is not completed, processing for inputting an image signal corresponding to the next pixel to the color space matching discrimination circuit 106 is performed, i.e., the flow returns to the processing in step S9. On the other hand, if it is determined that the scan is completed (YES in step S13), the second scan is started.

Since the sequence associated with the second scan in this embodiment (step S4 in FIG. 14) is substantially the same as that of the first scan, a detailed description thereof will be omitted. The difference between the first and second scans is only the addresses of the memory 122 for storing discrimination results, and bn (n=0 to 7) corresponds to MKn (n=0 to 7).

After the end of the second scan in step S4, the discrimination results, associated with identical specific originals, of the two scans are logically ANDed in step S5, and if one of ANDs for the eight different specific originals is "true" (YES in step S5), the CPU 121 sets the discrimination correction signal f 113 to be "1"(High) (step S6). On the other hand, if the discrimination result is "false" (NO in step S5), the signal f 113 remains "0" (Low).

The relations mentioned above can be expressed as follows:

$$f\ 113 = (\ (a0)\ \&\ (b0)\ )\ |\ (\ (a1)\ \&\ (b1)\ )\ |\\ (\ (a2)\ \&\ (b2)\ )\ |\ (\ (a3)\ \&\ (b3)\ )\ |\\ (\ (a4)\ \&\ (b4)\ )\ |\ (\ (a5)\ \&\ (b5)\ )\ |\\ (\ (a6)\ \&\ (b6)\ )\ |\ (\ (a7)\ \&\ (b7)\ )\ \ldots (2)$$

Note that, for example, (a0) is a value stored in the area of address a0 in the memory 122, & represents ANDing, and | represents ORing.

After the above-mentioned processing, the third scan (step S7) and the fourth scan (step S8) are performed, and the copy processing ends. When a specific original is discriminated in the above-mentioned processing, the copying operation is performed under print conditions different from normal ones in the third and fourth scans. For example, color tone of a reproduced image is changed, the reproduced image is painted in black, the power supply of the copying machine is turned off, and so on, thus inhibiting a normal image forming operation (an image output having a high fidelity to the original).

As described above, by discriminating a single specific original using different types of color tone distribution information in the first and second scans, it is possible to improve the discrimination accuracy of the specific original. In other words, since a single discrimination circuit discriminates a single specific original independent of the scan order, the discrimination accuracy of the specific original can be improved without increasing the capacity of the memory for storing color tone information.

Second Embodiment

The second embodiment of the present invention will be described below. Since the entire copying machine according to this embodiment has the same arrangement and signal processing system as those of the copying machine according to the first embodiment, a detailed description thereof will be omitted. In this embodiment, the case will be examined below wherein the obverse and reverse sides of three different banknotes, i. e., a total of six different specific originals are to be discriminated, as shown in FIGS. 17A to 17F.

As shown in FIGS. 17A to 17F, three different specific originals as the obverse sides of three different banknotes, and three different specific originals as the reverse sides of the three different banknotes respectively have red and brown patterns at their central portions as common portions. In this embodiment, these patterns are discriminated using common color tone distribution information, and this discrimination result and discrimination results of characteristic portions of these originals are logically ANDed.

FIG. 18 shows the allocation of color tone distribution information stored in the ROM 204 according to this embodiment. Referring to FIG. 18, yellow0 to yellow3 respectively indicate four different types of color tone distribution information for discriminating a yellow portion of a specific original A (obverse side of a banknote 1) in FIG. 17; green0 to green3 respectively indicate four different types of color tone distribution information for discriminating a green portion of a specific original C (obverse side of a banknote 2); blue0 to blue3 respectively indicate four different types of color tone distribution information for discriminating a blue portion of a specific original E (obverse side of a banknote 3); yellow/red0 to yellow/red3 respectively indicate four different types of color tone distribution information for discriminating a yellow/red portion of a specific original B (reverse side of a banknote 1); green/red0 to green/red3 respectively indicate four different types of color tone distribution information for discriminating a green/red portion of a specific original D (reverse side of a banknote 2); blue/red0 to blue/red3 respectively indicate four different types of color tone distribution information for discriminating a blue/red portion of a specific original F (reverse side of a banknote 3); red0 to red3 respectively indicate four different types of color tone distribution information for discriminating a central red portion of specific originals A, C, and E; and brown0 to brown3 respectively indicate four different types of color tone distribution information for discriminating a central brown portion of specific originals B, D, and F.

Figure 19:
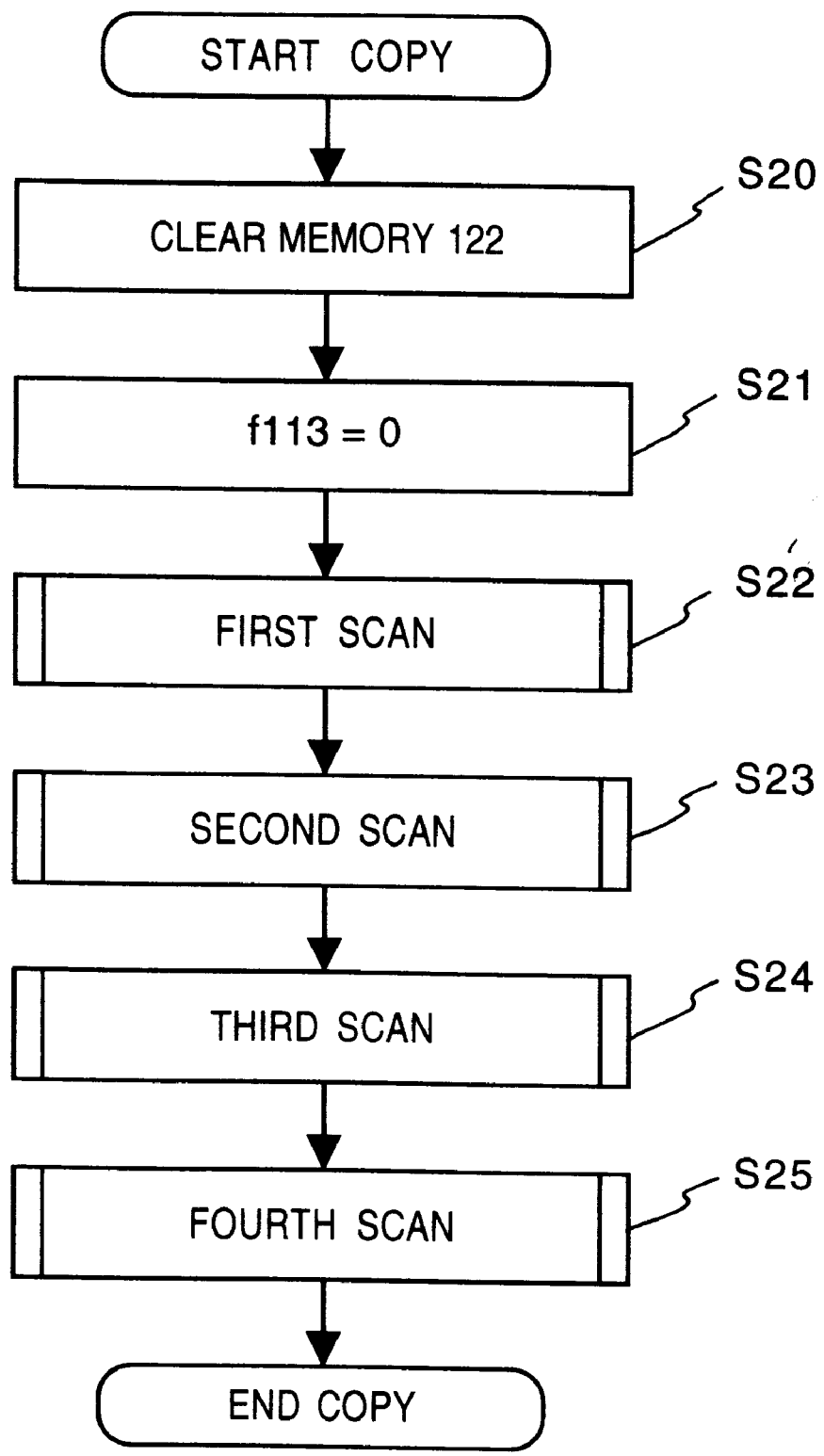
FIG. 19 is a flow chart showing a sequence for setting a discrimination correction signal f 113 to be "1" or "0" by a CPU 121 according to the second embodiment.
Figure 20:
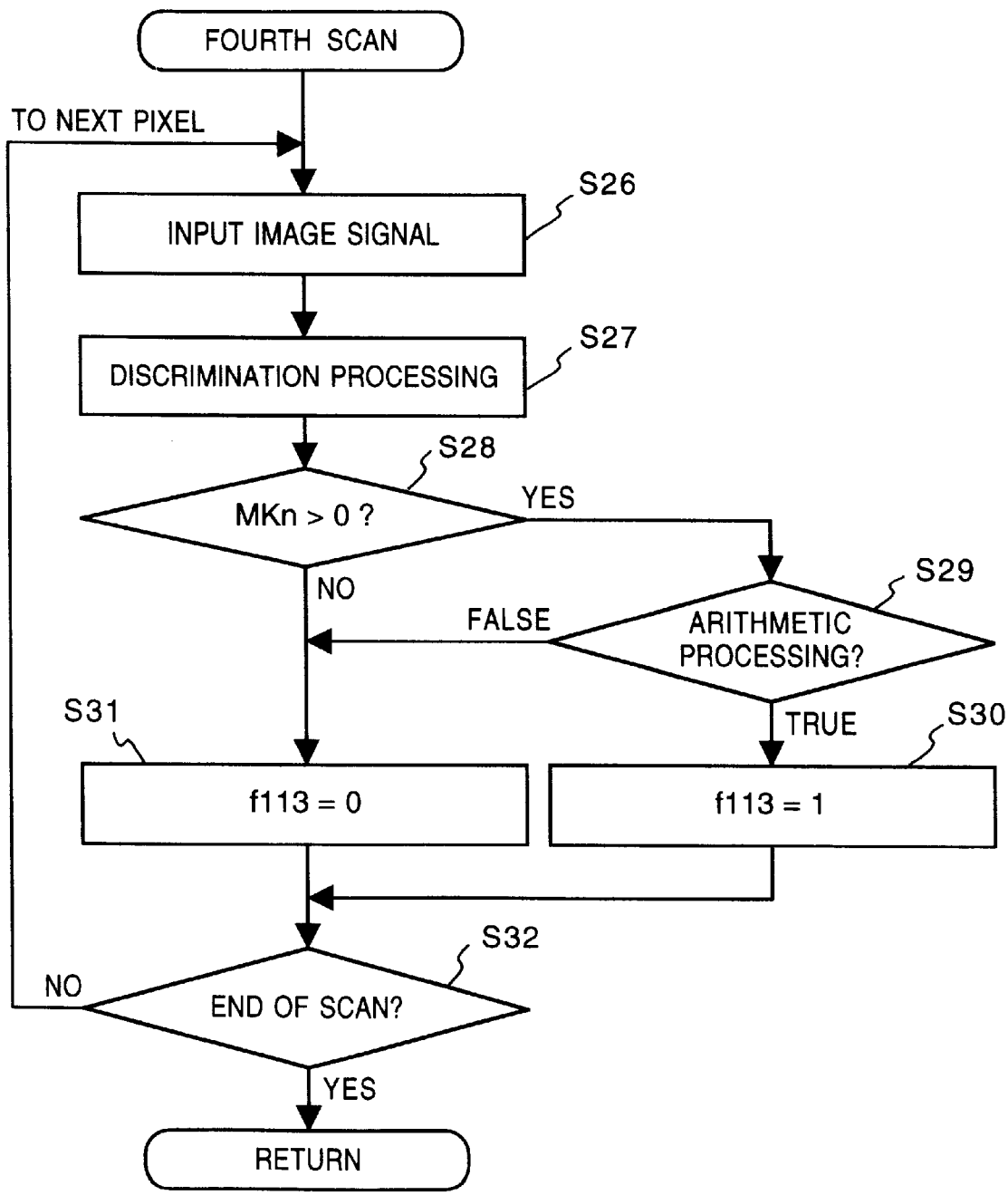
FIG. 20 is a flow chart showing the sequence for setting the discrimination correction signal f 113 to be "1" or "0" by the CPU 121 of the second embodiment.

FIGS. 19 and 20 are flow charts showing the sequence for setting the discrimination correction signal f 113 to be "1" or "0" by the CPU 121 according to this embodiment. More specifically, the CPU 121 of this embodiment sets the discrimination correction signal f 113 to be "1"(High) or "0"(Low) in accordance with the sequence shown in FIGS. 19 and 20.

Referring to FIG. 19, when a copying operation is started, the CPU 121 clears the memory 122 to zero (step S20). The CPU 121 sets the discrimination correction signal f 113 to be "0"(Low) (step S21). Subsequently, the CPU 121 executes the first scan (step S22), the second scan (step S23), and the third scan (step S24). Since the execution sequence of each of these scans is the same as that in the first embodiment shown in FIG. 15, a detailed description thereof will be omitted.

In this embodiment, the fourth scan in step S25 has different control contents from those of other scans since the discrimination correction signal f 113 may be changed during this scan.

FIG. 20 is a flow chart showing the sequence of the fourth scan according to this embodiment. More specifically, when the fourth scan is started, an image signal is input to the color space matching discrimination circuit 106 (step S26), and the discrimination signal of the input image signal is performed (step S27).

If one of the above-mentioned color space similarity discrimination signals MKn (n=0 to 7) output from the color space discrimination circuits is "1"(YES in step S28), arithmetic processing is executed, i.e., "1" is stored in the corresponding address area of the memory 122, and the discrimination result in this scan is logically ANDed with the discrimination results, associated with an identical specific original, in other scans (step S29).

The logic arithmetic operation for determining the value of the discrimination correction signal f 113 using the addresses of the memory 122 corresponding to the allocation of the color tone distribution information shown in FIG. 18 is expressed as follows:

$$
\begin{aligned}
f\ 113 = &[<\{\ (a0)\ \&\ (a1)\ \&\ (a2)\ \&\ (a3)\ \}\ |\\
&\ \ \ \ \{\ <(a4)\ \&\ (a5)\ \&\ (a6)\ \&\ (a7)\ \}\ |\\
&\ \ \ \ \{\ <(b0)\ \&\ (b1)\ \&\ (b2)\ \&\ (b3)\ \}\ >\\
&\ \ \ \ \&\\
&\ \ \ <\{\ (d0)\ \&\ (d1)\ \&\ (d2)\ \&\ (d3)\ \}>]\\
&\ |\\
&[<\{\ (b4)\ \&\ (b5)\ \&\ (b6)\ \&\ (b7)\ \}\ |\\
&\ |\\
&\ \ \ \ \{\ (c0)\ \&\ (c1)\ \&\ (c2)\ \&\ (c3)\ \}\ |\\
&\ \ \ \ \{\ (c4)\ \&\ (c5)\ \&\ (c6)\ \&\ (c7)\ \}>\\
&\ \ \ \ \&\\
&\ \ \ <\{\ (d4)\ \&\ (d5)\ \&\ (d6)\ \&\ (d7)\ \}>]\ldots(3)
\end{aligned}
$$

Note that, for example (a0) is a value stored in the area of address a0 of the memory 122, & represents ANDing, and | represents ORing.

If the arithmetic result is "true" (YES in step S29), the discrimination correction signal f 113 is set to be "1" (High) (step S30). On the other hand, if the result is "false" (NO in step S29), the signal f 113 is set to be "0" (step S31). If it is determined in step S32 that the scan is not completed, processing for inputting an image signal corresponding to the next pixel to the color space matching discrimination circuit 106 is performed, i.e., the flow returns to the processing in step S26.

On the other hand, if it is determined that the scan is completed (YES in step S32), the copying processing ends.

As described above, by performing the arithmetic operations for the discrimination results of specific originals for a plurality of scan operations, it is possible to improve discrimination accuracy of a specific original. And a further improvement of discrimination accuracy can be obtained by discriminating the original using plural kinds of color tone distribution information for the same color tone. It is also possible to decrease the amount of color tone distribution information to be held in the memory by commonly utilizing the discrimination result of common portions of a plurality of specific originals.

Third Embodiment

In the first and second embodiments, the color space similarity discrimination signal MKn is a binary signal. However, this does not impose a limitation upon the present invention. For example, the discrimination signal MKn may be a multi-value signal.

Figure 21:
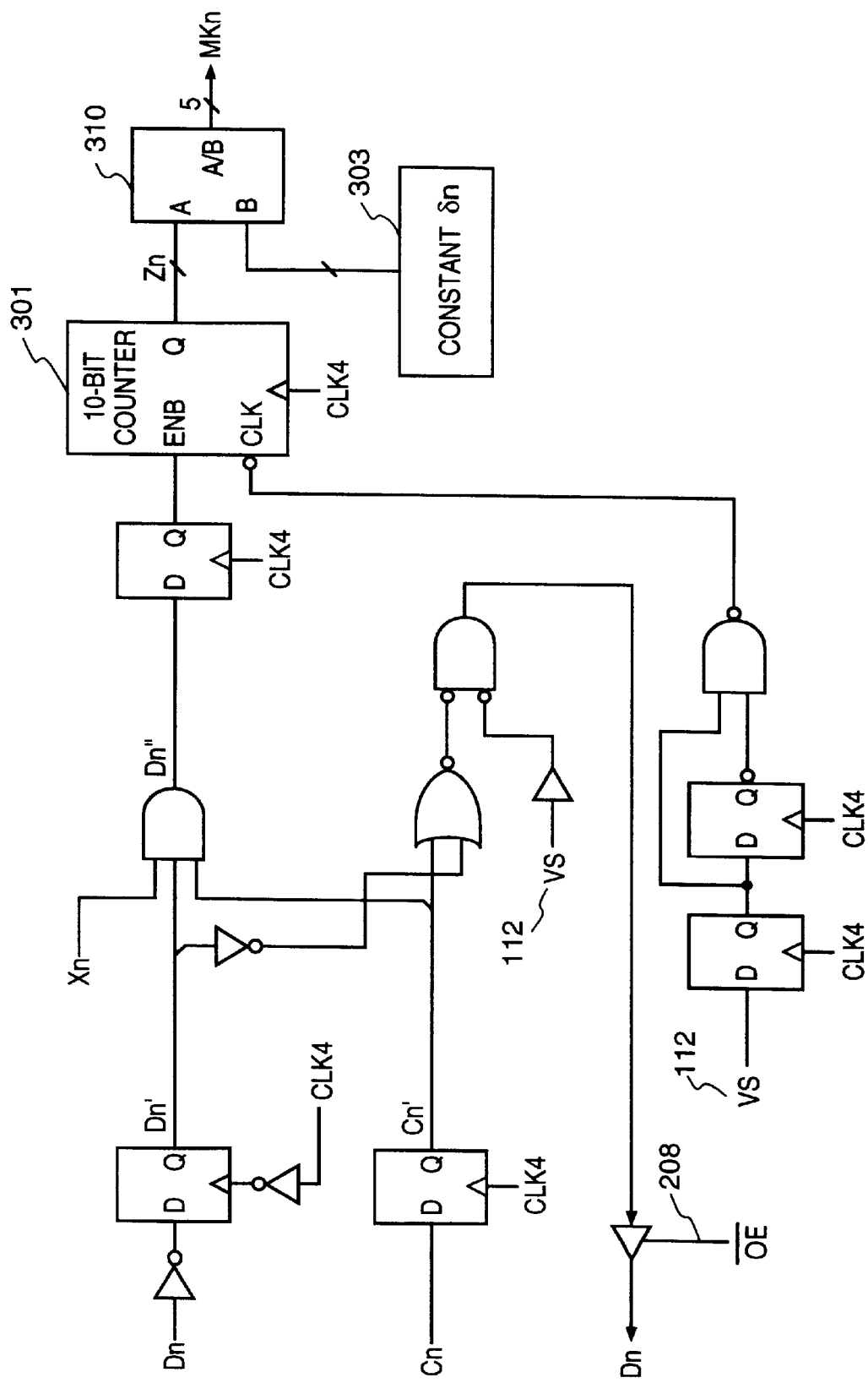
FIG. 21 is a block diagram showing the arrangement of a color space discrimination circuit constituting a copying machine according to the third embodiment of the present invention.

FIG. 21 is a block diagram showing the arrangement of a color space discrimination circuit constituting a copying machine according to this embodiment. The same reference numerals in FIG. 21 denote the same parts as in the color space discrimination circuit according to the first embodiment shown in FIG. 10, and a detailed description thereof will be omitted.

In the color space discrimination circuit of this embodiment shown in FIG. 21, an output value Zn from the counter 301 is divided by a constant δn from the register 303 by a divider 310, and the color space similarity discrimination signal MKn is output as a 5-bit value. Note that the value of the constant δn is set to be a value of 1/32 the volume Uorg shown in FIG. 9.

With the above-mentioned processing, the similarity between the distribution patterns of the color tone distribution of an input image signal and the color tone distribution of a specific original on the RGB color space is expressed by 5-bit multi-value data using the color space similarity discrimination signal MKn.

FIG. 22 is a block diagram showing the signal processing system of the color space matching discrimination circuit according to this embodiment. In this case, a detailed description of the same parts as those in the color space matching discrimination circuit according to the first embodiment shown in FIG. 2 will be omitted.

The difference between the color space matching discrimination circuit shown in FIG. 22 and the circuit shown in FIG. 2 is that, in this embodiment, the bus width of a signal line, for supplying the color space similarity discrimination signals MKn to the I/O port 120, is 40 bits in the color space matching discrimination circuit of this embodiment.

The logic arithmetic operation for determining the value of the discrimination correction signal f 113 for specific banknotes to be discriminated, used in the second embodiment, is expressed as follows in consideration of multi-value color space similarity discrimination signals MKn:

$$\begin{aligned} f\ 113 = &[\max\ [\min\ \{\ (a0),\ (a1),\ (a2),\ (a3),\\ &\qquad\qquad (d0),\ (d1),\ (d2),\ (d3)\ \},\\ &\qquad \min\ \{\ (a4),\ (a5),\ (a6),\ (a7),\\ &\qquad\qquad (d0),\ (d1),\ (d2),\ (d3)\ \},\\ &\qquad \min\ \{\ (b0),\ (b1),\ (b2),\ (b3),\\ &\qquad\qquad (d0),\ (d1),\ (d2),\ (d3)\ \}\ ]\\ &> s1]\\ &|\\ &[\max\ [\min\ \{\ (b4),\ (b5),\ (b6),\ (b7),\\ &\qquad\qquad (d4),\ (d5),\ (d6),\ (d7)\ \},\\ &\qquad \min\ \{\ (c0),\ (c1),\ (c2),\ (c3),\\ &\qquad\qquad (d4),\ (d5),\ (d6),\ (d7)\ \},\\ &\qquad \min\ \{\ (c4),\ (c5),\ (c6),\ (c7),\\ &\qquad\qquad (d4),\ (d5),\ (d6),\ (d7)\ \},\\ &> s2]\qquad\qquad\qquad\ \ldots (4) \end{aligned}$$

Note that, for example, (a0) is a value stored in the area of address a0 in the memory 122, | represents ORing, and s1 and s2 are threshold values (corresponding to "L" in formula (1) in the first embodiment).

By appropriately setting the threshold values s1 and s2 in formula (4) above, the multi-value similarity between the distribution patterns of the color tone distribution of an input image signal and the color tone distribution of a specific original on the RGB color space is discriminated.

As described above, since multi-value color space similarity discrimination signals are used, more robust discrimination of specific originals can be realized.

As described above, according to the embodiments described above, since the degree of freedom of discrimination of a specific original can be improved using a plurality of types of color tone distribution information, and discrimination conditions become strict, the discrimination accuracy can be improved.

According to the embodiments described above, similarity discrimination of common portions of a plurality of types of specific originals can be achieved by a minimum number of scans, and discrimination of specific originals, free from discrimination errors and having higher accuracy, can be realized.

Furthermore, according to the embodiments described above, a visible output of an original which has a higher similarity to a specific original can be inhibited, and the specific original can be prevented from being counterfeited.

The present invention is applicable to either a system constituted by a plurality of devices, such as a scanner, a printer and the like or an apparatus consisting of a single device such as a copying machine and the like. The present invention is also applicable to a case wherein the invention is achieved by supplying a program, via a storage medium, such as a floppy disk and the like, to the system or apparatus for realizing the above-mentioned algorithm.

In the above-mentioned embodiment, a comparison of the color distribution in a predetermined color space is performed to judge the features of a specific original. But, the present invention is not limited to this structure. Other kinds of judgment standards, such as matching of a pattern of a predetermined color, which has been extracted from an image of interest with a standard pattern, may be used. Furthermore, for judging plural features of a single specific original, plural kinds of judgment standards, such as the above-mentioned color distribution and pattern matching, may also be used.

In the equation (3), the values (a0), (a1), (a2) and (a3) are logically ANDed for determining the discrimination correction signal f 113. However, these values may be logically ORed. This operation brings about the advantage that determination of a specific original can thoroughly be done.

Other than changing the color tones and turning off the power as described above, processing such as halting a the discharge of paper may be performed when an input image is discriminated to be a predetermined image.

The above-mentioned discrimination algorithm can be applied to not only an image forming apparatus, such as a coping machine, but to an individual scanner, a printer, a printer interface and the like. In addition to the prevention of counterfeiting in the image processing apparatus, the algorithm may also be used for only discrimination of a specific original, which is employed for example, in a bank-note dealing machine and an image-detection machine.

As many widely different embodiments of the present invention can be made without departing from the spirit and scope thereof, it is to be understood that the invention is not limited to the specific embodiments thereof except as defined in the appended claims. A combination of specific embodiments can be made without departing from the spirit and scope of the claims.

What is claimed is:

1. An image processing apparatus comprising:
    reading means for scanning an original and generating image data;
    storage means for storing first color information corresponding to a color pattern common to a group of reproduction-inhibited originals and second color information corresponding to a color pattern particular to each of another group of reproduction-inhibited originals;
    first judging means for judging whether said original has the first color information, based on image data generated in a first scanning of said reading means;
    second judging means for judging whether said original has the second color information, based on image data generated in a second scanning of said reading means; and
    discrimination means for discriminating whether said original is a predetermined original by performing a calculation using judging results of said first judging means and said second judging means.

2. The apparatus according to claim 1, wherein said first and second judging means perform their judging operations based on a color distribution.

3. The apparatus according to claim 1, further comprising:
processing means for processing the image data input by input means, based on results of said first and second judging means.

4. An image processing method comprising:
a reading step of scanning an original and generating image data;
a storing step of storing first color information corresponding to a color pattern common to a group of reproduction-inhibited originals and second color information corresponding to a color pattern particular to each of another group of reproduction-inhibited originals into a memory;
a first judging step of judging whether said original has the first color information, based on image data generated in a first scanning in said reading step;
a second judging step of judging whether said original has the second color information, based on image data generated in a second scanning in said reading step; and
a discriminating step of discriminating whether said original is a predetermined original by performing a calculation using judging results obtained in said first judging step and said second judging step.

5. An image processing apparatus comprising:
generating means for generating image data corresponding to an image;
storage means for storing first color information corresponding to a color pattern common to a group of reproduction-inhibited originals and second color information corresponding to a color pattern particular to each of another group of reproduction-inhibited originals;
first judging means for judging whether said image has the first color information, based on image data generated by said generating means;
second judging means for judging whether said image has the second color information, based on image data generated by said generating means; and
discrimination means for discriminating whether said image is a predetermined original by using judging results of said first and second judging means.

6. The apparatus according to claim 5, wherein said first and second judging means perform their judging operations based on a color distribution.

7. The apparatus according to claim 5, further comprising processing means for processing the image data generated by said reading means, based on judging results of said first and second judging means.

8. An image processing method comprising:
a generating step of generating image data corresponding to an image;
a storing step of storing first color information corresponding to a color pattern common to a group of reproduction-inhibited originals and second color information corresponding to a color pattern particular to each of another group of reproduction-inhibited originals into a memory;
a first judging step of judging whether said image has the first color information, based on image data generated in said generating step;
a second judging step of judging whether said image has the second color information, based on image data generated in said generating step; and
discrimination step of discriminating whether said image is a predetermined original by using judging results in said first and second judging steps.

9. The method according to claim 8, wherein said first and second judging steps perform their judging operations based on a color distribution.

10. The method according to claim 8, further comprising a processing step of processing the image data generated in said reading step, based on judging results of said first and second judging steps.

11. A computer program product, comprising a computer readable medium having computer program codes, for executing image processing, said product including:
generation process procedure codes for generating image data corresponding to an image;
storing process procedure codes for storing first color information corresponding to a color pattern common to a group of reproduction-inhibited originals and second color information corresponding to a color pattern particular to each of another group of reproduction-inhibited originals into a memory;
first judging process procedure codes for judging whether said image has the first color information, based on image data generated by executing said generation process procedure codes;
second judging process procedure codes for judging whether said image has the second color information, based on image data generated by executing said generation process procedure codes; and
discrimination process procedure codes for discriminating whether said image is a predetermined original by using judging results obtained by executing said first and second judging process procedure codes.

12. A discrimination device for outputting a control signal to control an image processing apparatus in accordance with a discrimination result by a discrimination circuit, comprising:
a generating circuit generating image data corresponding to an image;
a memory circuit storing first color information corresponding to a color pattern common to a group of reproduction-inhibited originals and second color information corresponding to a color pattern particular to each of another group of reproduction-inhibited originals;
a first judging circuit judging whether said image has the first color information, based on image data generated by said generating circuit;
a second judging circuit judging whether said image has the second color information, based on image data generated by said generating circuit;
a discrimination circuit discriminating whether said image is a predetermined original by using judging results by said first and second judging circuits; and
an output circuit outputting the result of said discrimination.

13. The device according to claim 12, wherein said first and second judging circuits respectively perform judgment by using a pattern matching technique.

14. The device according to claim 12, wherein the first feature includes a quasi-circular shape appeared on each of the group or reproduction-inhibited originals.

15. The device according to claim 12, wherein said image processing apparatus is a copying machine.

16. The device according to claim 12, wherein the control signal is a signal used for controlling image processing performed by said image processing apparatus.

17. The device according to claim 12, wherein the control signal is a signal used for inhibiting a normal image reproduction in said image processing apparatus.

18. The device according to claim 12, wherein said image processing apparatus is a printer.

* * * * *

UNITED STATES PATENT AND TRADEMARK OFFICE
CERTIFICATE OF CORRECTION

PATENT NO. : 5,933,520

DATED : August 3, 1999

INVENTOR(S): KOICHI ISHIMOTO, ET AL.

It is certified that error appears in the above-identified patent and that said Letters Patent is hereby corrected as shown below:

Title page, item [56]

References Cited

FOREIGN PATENT DOCUMENTS

"5536873   3/1980   Japan." should be deleted.
"60-87380  5/1984   Japan." should be deleted.
"4016707   1/1992   Japan" should be deleted.
"A1400806  7/1995   United Kingdom." should be deleted.

COLUMN 5

Line 41, "inparalled," should read --in parallel,--.

COLUMN 6

Line 37, "similarly" should read --similarity--.
Line 42, "RBG" should read --RGB--.

UNITED STATES PATENT AND TRADEMARK OFFICE
CERTIFICATE OF CORRECTION

PATENT NO. : 5,933,520

DATED : August 3, 1999

INVENTOR(S): KOICHI ISHIMOTO, ET AL.

It is certified that error appears in the above-identified patent and that said Letters Patent is hereby corrected as shown below:

COLUMN 7

Line 2, "similarly" should read --similarity--.
Line 63, ""1"(YES" should read --"1" (YES--,

COLUMN 8

Line 41, "color" should read --the color--.

COLUMN 12

Line 6, "device" should read --device,--.
Line 27, "a" should be deleted.
Line 32, "coping" should read --copying--.

UNITED STATES PATENT AND TRADEMARK OFFICE
CERTIFICATE OF CORRECTION

PATENT NO. : 5,933,502

DATED : August 3, 1999

INVENTOR(S): KOICHI ISHIMOTO, ET AL.

It is certified that error appears in the above-identified patent and that said Letters Patent is hereby corrected as shown below:

COLUMN 14

Line 54, "appeared" should read --appearing--.
Line 55, "or" should read --of--.

Signed and Sealed this

Ninth Day of May, 2000

Q. TODD DICKINSON

Attest:

Attesting Officer

Director of Patents and Trademarks